United States Patent
Horning et al.

(10) Patent No.: US 10,859,162 B2
(45) Date of Patent: Dec. 8, 2020

(54) ROTATING PISTON FOR PUMPS

(71) Applicant: Graco Minnesota Inc., Minneapolis, MN (US)

(72) Inventors: Jeromy D. Horning, Albertville, MN (US); Christopher A. Lins, Waverly, MN (US); James A. Klaverkamp, Clearwater, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 21 days.

(21) Appl. No.: 16/416,658

(22) Filed: May 20, 2019

(65) Prior Publication Data

US 2019/0271396 A1 Sep. 5, 2019

Related U.S. Application Data

(63) Continuation of application No. 15/395,147, filed on Dec. 30, 2016, now Pat. No. 10,337,614.

(Continued)

(51) Int. Cl.
*F16J 1/09* (2006.01)
*F04B 7/06* (2006.01)

(Continued)

(52) U.S. Cl.
CPC .............. *F16J 1/09* (2013.01); *F04B 1/0408* (2013.01); *F04B 7/06* (2013.01); *F04B 13/00* (2013.01);

(Continued)

(58) Field of Classification Search
CPC ..... F16J 1/09; F04B 7/06; F04B 13/00; F04B 15/00; F04B 19/003

(Continued)

(56) References Cited

U.S. PATENT DOCUMENTS 2,394,371 A   2/1946  Davis
3,057,300 A  10/1962  Ulbing (Continued)

FOREIGN PATENT DOCUMENTS

CN   2206361 Y   8/1995
CN   2687377 Y   3/2005

(Continued)

OTHER PUBLICATIONS

Extended European Search Report for EP Application No. 16207457.9, dated Sep. 12, 2017, pp. 8.

(Continued)

*Primary Examiner* — Thomas E Lazo
*Assistant Examiner* — Daniel S Collins
(74) *Attorney, Agent, or Firm* — Kinney & Lange, P. A.

(57) ABSTRACT

A piston is the driven component within a pump. The piston is driven along a longitudinal axis to pump a fluid through the pump. The fluid flows through the piston between an upstream end of the pump and a downstream end of the pump. The piston outputs the fluid into the downstream end of the pump at a vector offset from the longitudinal axis, thereby inducing rotation of the piston throughout the pumping process. Rotating the piston encourages even wear on various components within the pump, such as sealing rings surrounding the piston, thereby increasing the lifespan of the components and increasing the efficiency of the pump.

20 Claims, 13 Drawing Sheets

Related U.S. Application Data

(60) Provisional application No. 62/272,779, filed on Dec. 30, 2015, provisional application No. 62/272,771, filed on Dec. 30, 2015.

(51) Int. Cl.

| | | |
|---|---|---|
| *F04B 13/00* | (2006.01) | |
| *F04B 15/00* | (2006.01) | |
| *F04B 17/03* | (2006.01) | |
| *F04B 17/06* | (2006.01) | |
| *F04B 53/14* | (2006.01) | |
| *F04B 53/12* | (2006.01) | |
| *F04B 1/0408* | (2020.01) | |
| *F04B 19/00* | (2006.01) | |
| *F04B 19/22* | (2006.01) | |
| *F04B 53/18* | (2006.01) | |

(52) U.S. Cl.
CPC .............. *F04B 15/00* (2013.01); *F04B 17/03* (2013.01); *F04B 17/06* (2013.01); *F04B 19/003* (2013.01); *F04B 19/22* (2013.01); *F04B 53/126* (2013.01); *F04B 53/14* (2013.01); *F04B 53/144* (2013.01); *F04B 53/147* (2013.01); *F04B 53/148* (2013.01); *F04B 53/18* (2013.01)

(58) Field of Classification Search
USPC .......................................................... 92/173
See application file for complete search history.

(56) References Cited

U.S. PATENT DOCUMENTS

| | | | |
|---|---|---|---|
| 3,106,138 A | 10/1963 | Thoma | |
| 3,170,298 A | 2/1965 | Shellhause | |
| 3,172,338 A | 3/1965 | Ackerman | |
| 3,351,316 A | 11/1967 | Lewis et al. | |
| 3,489,093 A | 1/1970 | Thornber | |
| 4,089,229 A | 5/1978 | Geraci | |
| 4,180,028 A | 12/1979 | Richter | |
| 4,479,759 A | 10/1984 | Zeitz | |
| 4,785,997 A | 11/1988 | Liska et al. | |
| 4,804,109 A | 2/1989 | Vanderjagt | |
| 5,211,611 A | 5/1993 | Lammers et al. | |
| 5,435,697 A | 7/1995 | Guebeli et al. | |
| 5,660,534 A * | 8/1997 | Snow ..................... | F04B 47/02 417/554 |
| 5,740,718 A | 4/1998 | Rathweg | |
| 6,212,999 B1 | 4/2001 | Thompson | |
| 6,244,226 B1 | 6/2001 | Berlinger et al. | |
| 6,283,148 B1 | 9/2001 | Spears et al. | |
| 6,481,987 B2 | 11/2002 | Ford | |
| 6,599,107 B2 | 7/2003 | Cooper et al. | |
| 6,702,067 B2 | 5/2004 | Iversen et al. | |
| 7,428,923 B2 | 9/2008 | Ford | |
| 7,713,035 B2 | 5/2010 | Ford | |
| 7,878,767 B2 | 2/2011 | Ford | |
| 3,272,858 A1 | 9/2012 | Bollwerk et al. | |
| 8,360,756 B2 | 1/2013 | Ford | |
| 9,032,862 B2 | 5/2015 | Yong et al. | |
| 9,188,120 B2 | 11/2015 | Ford | |
| 9,341,183 B1 | 5/2016 | Carruth et al. | |
| 2008/0217565 A1 | 9/2008 | Ford | |
| 2011/0024370 A1 | 2/2011 | Ford | |
| 2014/0231537 A1 | 8/2014 | Hukriede et al. | |
| 2016/0186788 A1 | 6/2016 | Davidson et al. | |
| 2016/0211723 A1 | 7/2016 | Davidson et al. | |

FOREIGN PATENT DOCUMENTS

| | | |
|---|---|---|
| CN | 2727450 Y | 9/2005 |
| CN | 204511866 U | 7/2015 |
| DE | 4307327 A1 | 9/1994 |
| WO | WO0111213 A1 | 2/2001 |

OTHER PUBLICATIONS

First Chinese Office Action for CN Application No. 2016112613922, dated May 10, 2019, pp. 27.

Second Chinese Office Action for CN Application No. 2016112613922, dated Jan. 3, 2019, pp. 21.

* cited by examiner

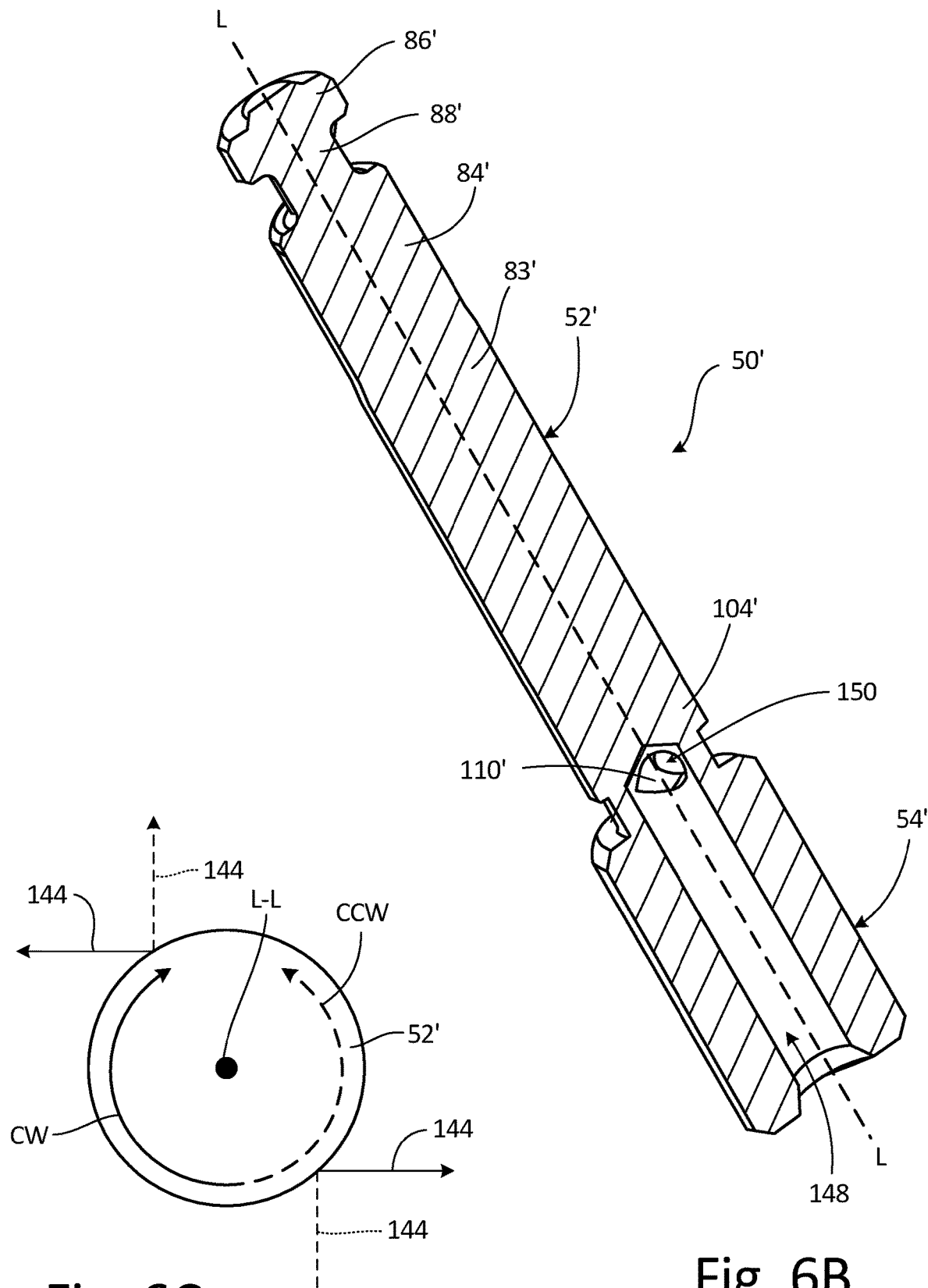

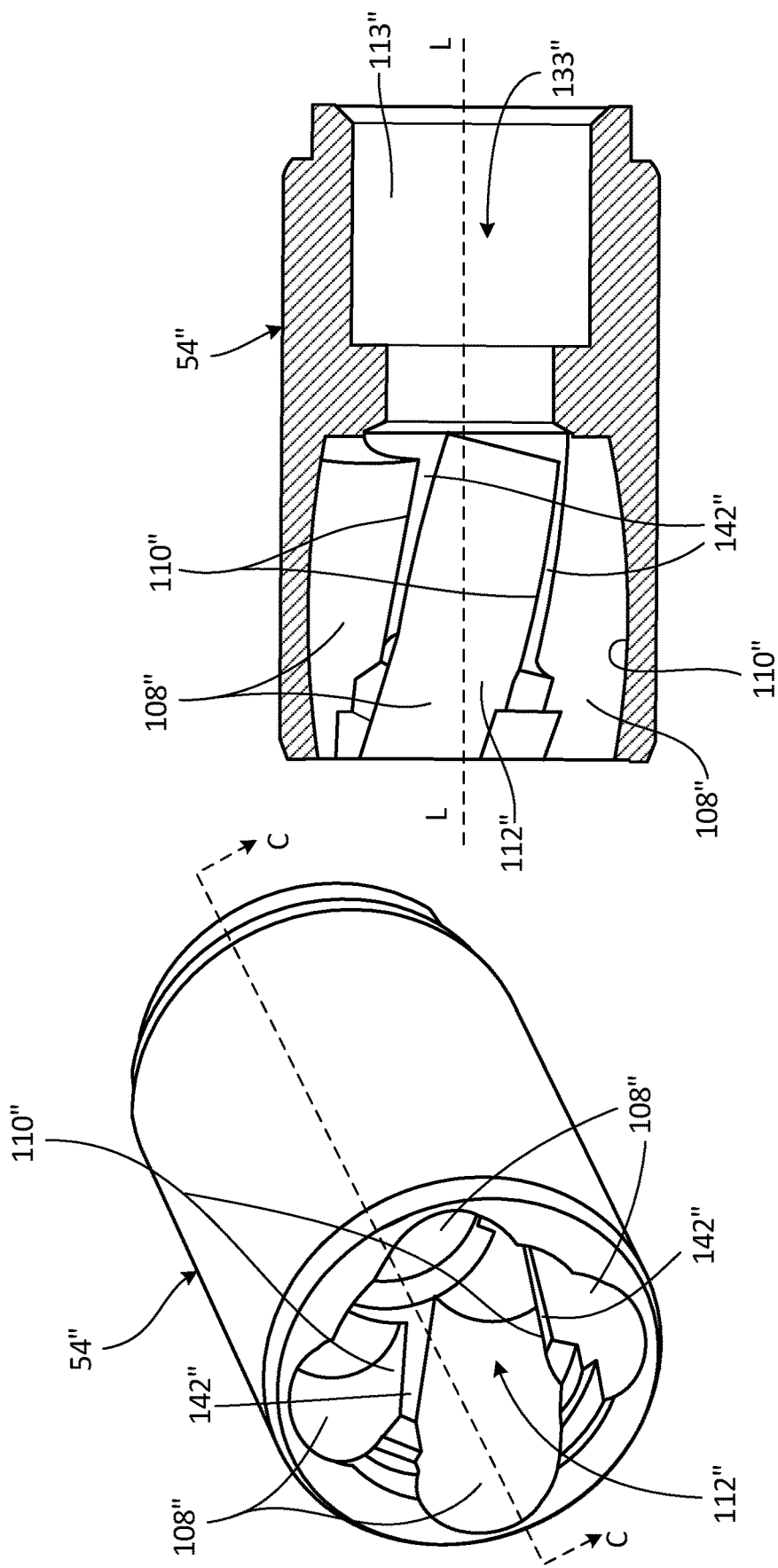

ROTATING PISTON FOR PUMPS

CROSS-REFERENCE TO RELATED APPLICATION(S)

This application is a continuation of U.S. application Ser. No. 15/395,147 filed Dec. 30, 2016 for "ROTATING PISTON FOR PUMPS" by J. D. Horning, C. A. Linn and J. A. Klaverkamp, which in turn claims the benefit of U.S. Provisional Application No. 62/272,779 filed Dec. 30, 2015, entitled "ROTATING PISTON ROD FOR PUMPS," which in turn claims the benefit of U.S. Provisional Application No. 62/272,771 filed Dec. 30, 2015, entitled "FLUTED PISTON ROD COMPONENTS," the disclosures of which are hereby incorporated in their entirety.

BACKGROUND

The present disclosure relates generally to fluid dispensing systems. More specifically, this disclosure relates to piston assemblies for a displacement pump of a fluid dispensing system.

Fluid dispensing systems, such as fluid dispensing systems for paint and other solutions, typically utilize axial displacement pumps to pull the fluid from a source and to drive the fluid downstream. The axial displacement pump includes a piston that reciprocates along a longitudinal axis to pump the fluid. Sealing rings surround the piston during operation and facilitate the creation of a vacuum condition in the displacement pump to allow the piston to pump the fluid. The sealing rings tightly interface with the piston, and the surfaces of the sealing rings experience wear due to the reciprocating motion of the piston. In addition, debris, such as grit or other solids in the fluid, can become lodged between the sealing rings and the piston. The debris can cause accelerated wear of the interfacing surface of the sealing rings, and the accelerated wear is often focused on one portion of the interfacing surface, causing asymmetrical circumferential wear. Asymmetrical wear leads to greater penetration of the fluid along the interfacing surface, and can lead to imbalance in the piston reciprocation and to the creation of bypass channels along the interfacing surfaces.

SUMMARY

According to one aspect, a pump includes a cylinder and a piston including a longitudinal axis. The piston is at least partially disposed within the cylinder, and the piston is configured to pump a fluid by reciprocating along the longitudinal axis. The piston is also configured to rotate relative to the cylinder as the piston reciprocates along the longitudinal axis.

According to another aspect, a piston for a fluid pump includes a piston having an aperture extending therethrough, a piston rod attached to the piston and at least partially extending into the aperture, a longitudinal axis common to the piston and the piston rod, and an angled surface on one of the piston and the piston rod. The angled surface is oriented to direct flow along a vector offset from the longitudinal axis and configured to induce rotation of the piston and the piston rod by directing the flow along the vector.

According to yet another aspect, a method of reducing wear in a piston pump includes driving a fluid downstream with a piston at least partially disposed in a stationary housing, and rotating the piston relative to the stationary housing.

According to yet another aspect, a piston for pumping fluid by reciprocating along a longitudinal axis includes a piston head and a piston rod connected to the piston head. One or both of the piston head and the piston rod include one or more internal passages through which the fluid is forced to flow by reciprocation of the piston. The one or more internal fluid passages are shaped to expel the fluid from the piston at one or more orientations offset from the longitudinal axis, thereby imparting a moment on the piston about the longitudinal axis to cause the piston to rotate during reciprocation of the piston.

According to yet another aspect, a pump includes a cylinder and a piston at least partially disposed within the cylinder and having one or more internal passages. The piston is configured to pump fluid by reciprocating along a longitudinal axis with respect to the cylinder, thereby forcing fluid to flow through the one or more internal fluid passages. The one or more fluid passages respectively includes one or more angled surfaces that expel fluid from the piston at one or more orientations that are each offset from the longitudinal aspect, thereby imparting a moment on the piston about the longitudinal axis to cause the piston to rotate relative to the cylinder during reciprocation of the piston.

BRIEF DESCRIPTION OF THE DRAWINGS

FIG. 6B is a cross-sectional view of the piston of FIG. 6A taken along line B-B of FIG. 6A.

FIG. 6C is a schematic view of a rotation of the piston rod of FIG. 6A.

FIG. 7B is an isometric view of a piston.

FIG. 7C is a cross-sectional view of the piston of FIG. 7B.

DETAILED DESCRIPTION

Pumps according to the present disclosure reciprocate a piston within a cylinder to pump various fluids, examples of which include paint, water, oil, stains, finishes, aggregate, coatings, and solvents, amongst other options. A piston pump can generate high fluid pumping pressures, such as 3,000-5,000 pounds per square inch or even higher. High fluid pumping pressure is useful for atomizing the fluid into a spray for applying the fluid to a surface. The generation of high fluid pumping pressure can cause accelerated wear in the components of the pump which reciprocate relative to one another. Aspects of the present disclosure can reduce or minimize the effects of wear in a piston pump, as further discussed herein.

Figure 1A:
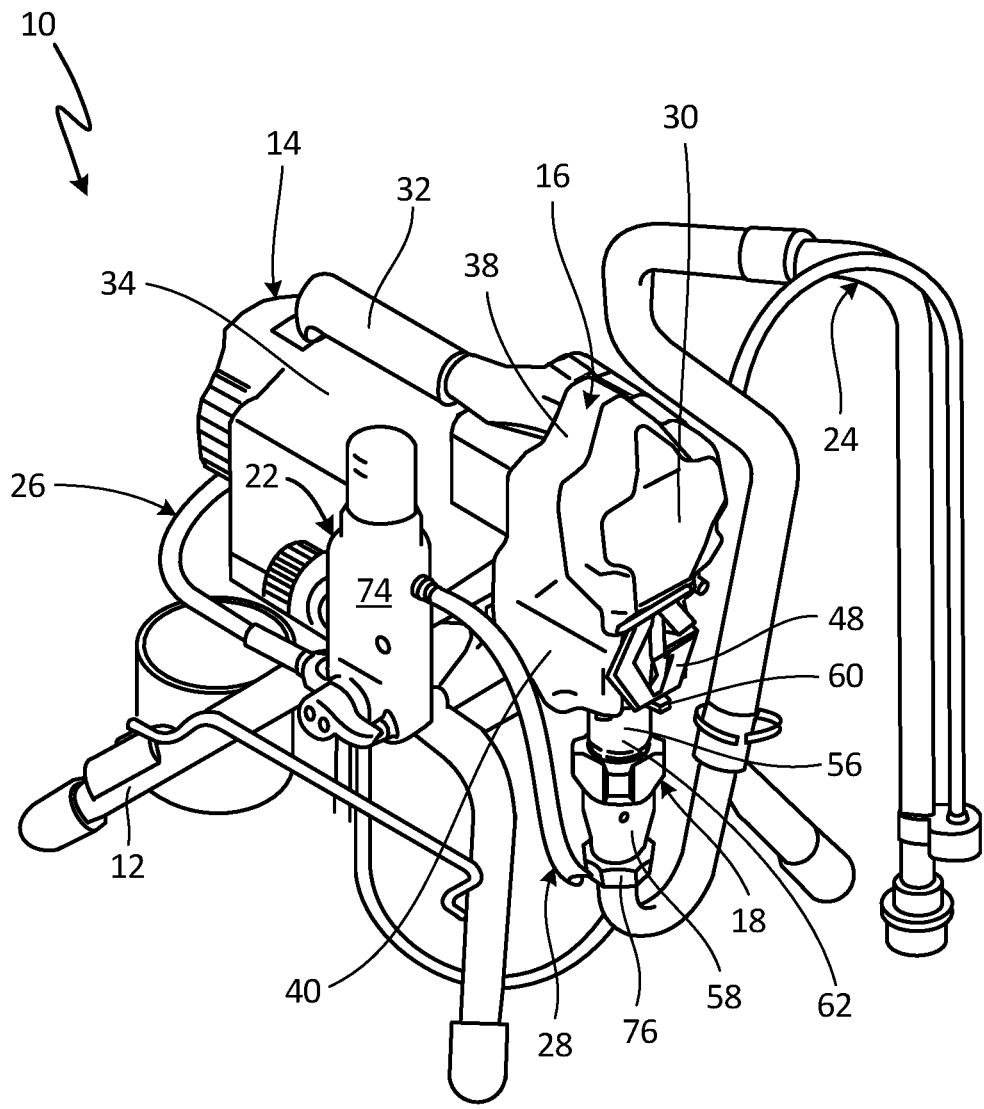
FIG. 1A is an isometric view of a fluid dispensing system.
Figure 1B:
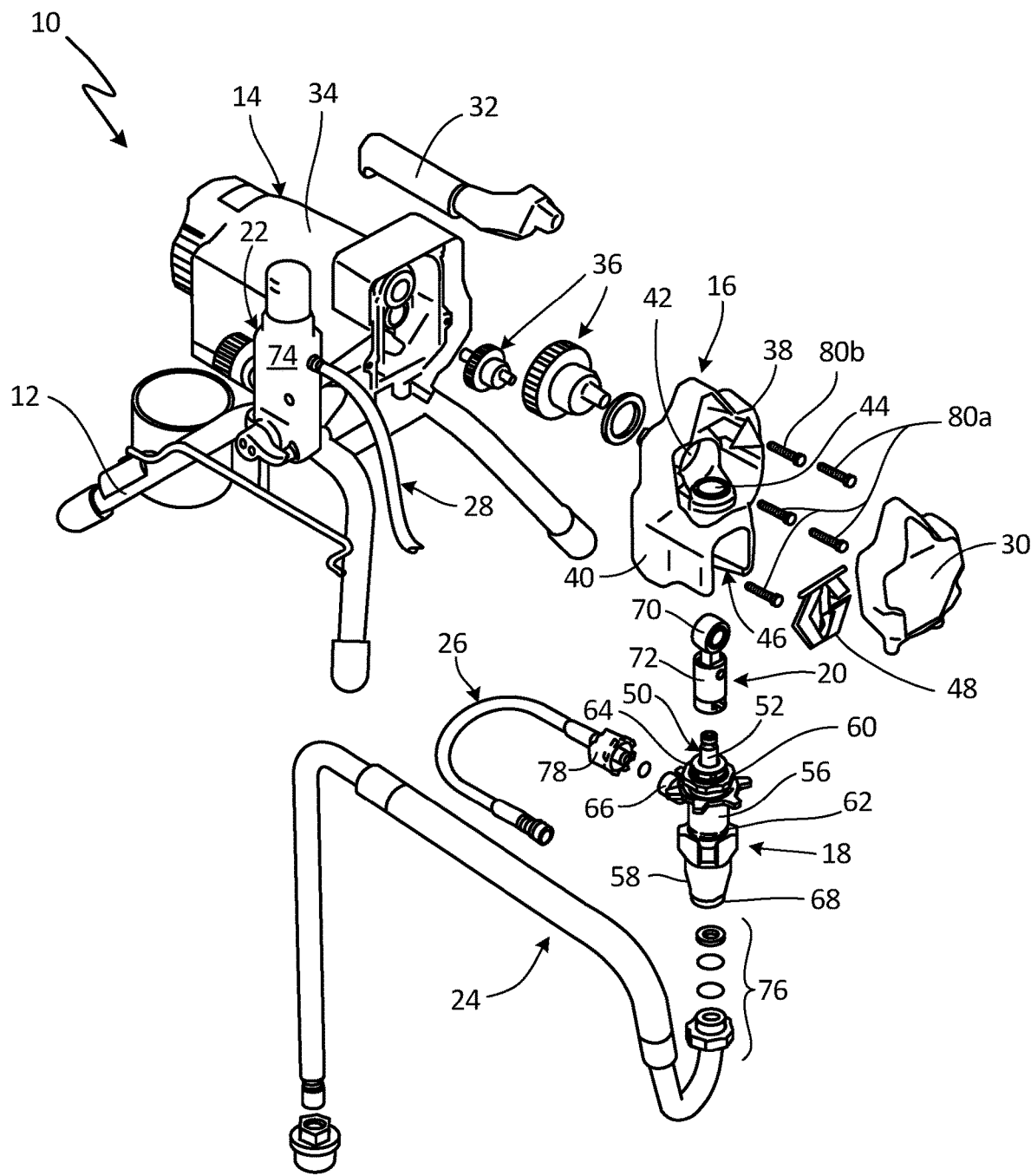
FIG. 1B is an exploded view of the fluid dispensing system of FIG. 1A.

FIG. 1A is an isometric view of fluid dispensing system 10. FIG. 1B is an exploded view of fluid dispensing system 10. FIGS. 1A and 1B will be discussed together. Fluid dispensing system 10 includes frame 12, motor section 14, drive housing 16, displacement pump 18, reciprocating drive 20, control system 22, intake hose 24, supply hose 26, dispensing hose 28, housing cover 30, and handle 32. Motor section 14 includes motor housing 34 and drive gears 36. Drive housing 16 includes upper portion 38 and lower portion 40. Upper portion 38 includes gear aperture 42 and link aperture 44. Lower portion 40 includes mounting cavity 46 and guard 48. Displacement pump 18 includes piston 50 (which includes piston rod 52 and piston head 54 (shown in FIGS. 2B-3B)), cylinder 56, intake housing 58, and clamp 60. Cylinder 56 includes upstream end 62, downstream end 64, and outlet port 66. Intake housing 58 includes inlet port 68. Reciprocating drive 20 includes connecting rod 70 and drive link 72. Control system 22 includes control housing 74. Intake hose 24 includes intake fitting 76, and supply hose 26 includes supply fitting 78.

Frame 12 supports motor section 14, and drive housing 16 is mounted to motor section 14. Fasteners 80a extend through drive housing 16 and into motor section 14 to secure drive housing 16 to motor section 14. Handle 32 is attached to drive housing 16 by fastener 80b, which extends through drive housing 16 and into handle 32. Housing cover 30 is attached to and encloses upper portion 38 of drive housing 16. Drive gears 36 are disposed within motor section 14 and extend into upper portion 38 of drive housing 16 through gear aperture 42. Drive gears 36 are driven by a motor (not shown) disposed within motor housing 34. Any desired motor can be utilized to power drive gears 36. For example, fluid dispensing system 10 can be electric, gas, pneumatic, or hydraulic powered.

Upper portion 38 of drive housing 16 is integral with lower portion 40 of drive housing 16. Gear aperture 42 extends through a rearward side of upper portion 38, and link aperture 44 extends through drive housing 16 between upper portion 38 and lower portion 40. Mounting cavity 46 extends into lower portion 40 and is configured to receive displacement pump 18. Guard 48 is mounted on lower portion 40 and is configured to cover mounting cavity 46.

Reciprocating drive 20 is disposed within drive housing 16. Drive link 72 is attached to connecting rod 70. Connecting rod 70 is disposed within upper portion 38 of drive housing, and drive link 72 extends through link aperture 44 and into mounting cavity 46. Connecting rod 70 is attached to and driven by drive gears 36 extending into upper portion 38 through gear aperture 42. Connecting rod 70 translates the rotational movement of drive gears 36 into linear movement of drive link 72.

Displacement pump 18 is at least partially disposed within mounting cavity 46 and can be secured by clamp 60. Clamp 60 extends about cylinder 56, and clamp 60 secures displacement pump 18 to lower portion 40 of drive housing 16. More specifically, the clamp 60 secures the cylinder 56 of the displacement pump to prevent relative rotation or other movement between the cylinder 56 and the drive housing 16 or other structural element of the fluid dispending system 10. While displacement pump 18 is described as being secured to drive housing 16 by clamp 60 disposed on cylinder 56, it is understood that displacement pump 18 can be mounted in any suitable manner. For example, displacement pump 18 can include external threads configured to mate with threading on drive housing 16, or displacement pump 18 can be secured by a clamping mechanism integral with drive housing 16.

Intake housing 58 is attached to upstream end 62 cylinder 56 to form a body of displacement pump 18. Piston 50 is at least partially disposed within displacement pump 18. Piston rod 52 extends into cylinder 56 through downstream end 64 of cylinder 56 and is connected to piston head 54, which is disposed within displacement pump 18. An end of piston rod 52 extending out of cylinder 56 is connected to drive link 72, and drive link 72 is configured to drive piston rod 52 in a reciprocating manner. Piston rod 52 can be connected to drive link 72 in any suitable manner for allowing piston 50 to rotate about a longitudinal axis of piston 50. For example, piston rod 52 can include a head mounted in a slot in drive link 72, as discussed below with regard to FIG. 2.

Intake hose 24 extends between a fluid source and displacement pump 18. Intake fitting 76 is connected to inlet port 68 to provide the fluid to intake housing 58. Any suitable fitting can be utilized to connect intake hose 24 to inlet port 68. Supply hose 26 extends between outlet port 66 of cylinder 56 and control housing 74, to provide the fluid from displacement pump 18 to control housing 74. Supply fitting 78 is connected to outlet port 66 to attached supply hose 26 to displacement pump 18. Any suitable fitting can be utilized to connect supply hose 26 to outlet port 66. Dispensing hose 28 is connected to control housing 74 and extends between control housing 74 and a dispenser (not shown), such as a spray gun. Control system 22 includes various components, such as a pressure regulator and a priming valve, utilized to set a flow rate and flow pressure, among other operational criteria, of the fluid. Dispensing hose 28 provides the fluid downstream of fluid dispensing system 10.

During operation, the motor of the motor section 14 drives drive gears 36 in a rotational manner, and connecting rod 70 follows drive gears 36 due to the connection of drive gears 36 and connecting rod 70. Connecting rod 70 translates the rotational movement of drive gears 36 into linear movement of drive link 72, such that drive link 72 reciprocates through link aperture 44. Drive link 72 thereby drives piston 50 in a reciprocating manner, due to the connection of piston rod 52 and drive link 72. Driving piston 50 in a reciprocating manner causes piston 50 to draw the fluid into displacement pump 18 through intake hose 24 and intake housing 58, and to pump the fluid downstream through cylinder 56 and supply hose 26.

The fluid is drawn from an external source (e.g., a bucket) through intake hose 24 and enters displacement pump 18 through inlet port 68. The fluid is driven through displacement pump 18 by piston 50, and the fluid exits displacement pump 18 through outlet port 66 in cylinder 56. The fluid flows into supply hose 26 from outlet port 66 and flows to control housing 74. The fluid exits control housing 74 through dispensing hose 28 and flows downstream to the dispenser, where the fluid can be dispensed for any desired purpose, such as applying paint to a surface with a spray gun. Displacement pump 18 thus draws the fluid from a container through intake hose 24, drives the fluid downstream to control system 22 through supply hose 26, and drives the fluid through dispensing hose 28 and to a dispenser where the fluid is applied in any desired manner.

Figure 2:
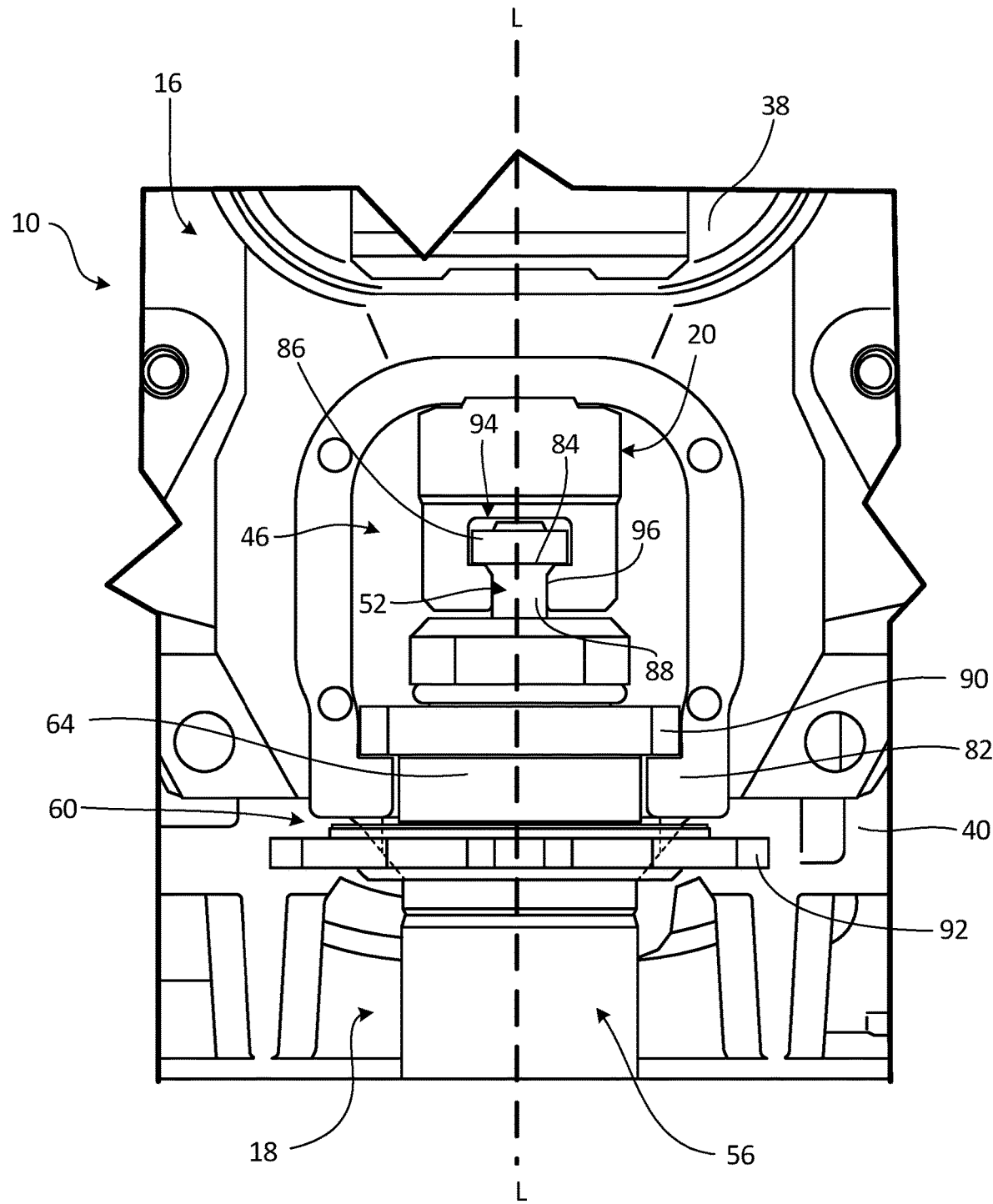
FIG. 2 is a partial, front elevation view of a fluid dispensing system showing the connection of a displacement pump and a reciprocating drive.

FIG. 2 is a partial, front elevation view of fluid dispensing system 10, showing the connection of displacement pump 18 and reciprocating drive 20. Drive housing 16 includes upper portion 38 and lower portion 40, and lower portion 40 includes mounting cavity 46. Mounting cavity 46 includes first flange 82. Cylinder 56 of displacement pump 18 is shown. Piston rod 52 of piston 50 is shown. Piston rod 52 includes first end 84, and first end 84 includes head 86 and neck 88. Clamp 60 includes mounting ring 90 and tightening ring 92. Drive link 72 of reciprocating drive 20 is shown, and drive link 72 includes drive cavity 94 and second flange 96.

Displacement pump 18 is attached to drive housing 16. Clamp 60 is disposed on cylinder 56 and secures displacement pump 18 to drive housing 16. Mounting ring 90 is affixed to cylinder 56 proximate downstream end 64 of cylinder 56, through which piston rod 52 extends. Tightening ring 92 is movably attached to cylinder 56 below mounting ring 90. With displacement pump 18 installed on drive housing 16, mounting ring 90 is disposed within mounting cavity 46 and rests on first flange 82 of mounting cavity 46, and tightening ring 92 is disposed outside of and below mounting cavity 46 and abuts a lower edge of first flange 82. Clamp 60 secures displacement pump 18 to drive housing 16 by having mounting ring 90 and tightening ring 92 exert a clamping force on first flange 82. While displacement pump 18 is described as being attached to drive housing 16 by clamp 60, it is understood that displacement pump 18 may be secured to drive housing 16 in any suitable manner. For example, displacement pump 18 may include external threads on cylinder 56 configured to mate with threading on drive housing 16, or displacement pump 18 may be secured by a clamping mechanism integral to drive housing 16.

Piston rod 52 extends out of downstream end 64 of cylinder 56 and is disposed within mounting cavity 46. Drive link 72 extends into mounting cavity 46 through link aperture 44 (shown in FIG. 1B). Piston rod 52 engages drive link 72 and is configured to be driven by drive link 72. Head 86 of piston rod 52 is disposed within drive cavity 94. Second flange 96 is disposed about neck 88, such that second flange 96 retains head 86 within drive cavity 94. Drive link 72 axially and laterally retains head 86. Head 86 is not fixed within drive cavity 94, however, and as such, head 86 is free to rotate within drive cavity 94 (and relative to the drive housing 16) such that piston 50 is free to rotate about longitudinal axis L-L. While piston rod 52 is described as being connected to drive link 72 by head 88 disposed within drive cavity 94, it is understood that piston rod 52 can be connected to a driving mechanism in any desired manner that drives piston rod 52 without restraining a rotation of piston rod 52 about longitudinal axis L-L.

During operation, drive link 72 is driven in a reciprocating manner by connecting rod 70 (shown in FIG. 1B). Drive link 72 correspondingly drives piston 50 in a reciprocating manner along longitudinal axis L-L, due to the connection of head 86 and drive link 72. Piston 50 pulls a fluid into displacement pump 18 and simultaneously drive the fluid downstream from displacement pump 18. As piston 50 reciprocates, piston 50 rotates about longitudinal axis L-L. Piston 50 can rotate about longitudinal axis L-L, unlike a piston that is pinned to a drive mechanism, because head 86 is freely rotatable circumferentially within drive cavity 94 while drive cavity 94 restricts movement of head 86 axially and laterally.

Figure 3A:
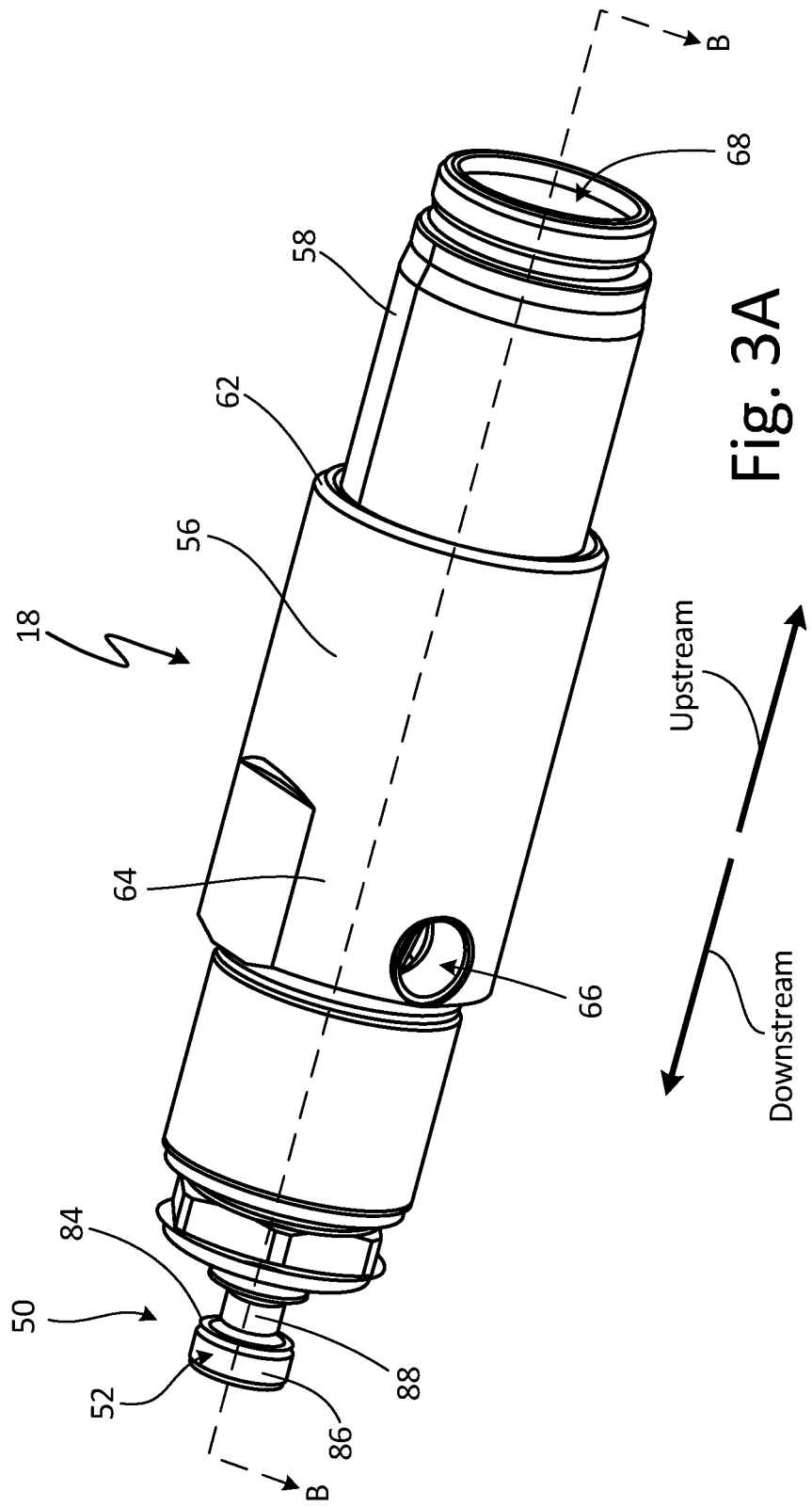
FIG. 3A is an isometric view of a fluid pump.
Figure 3B:
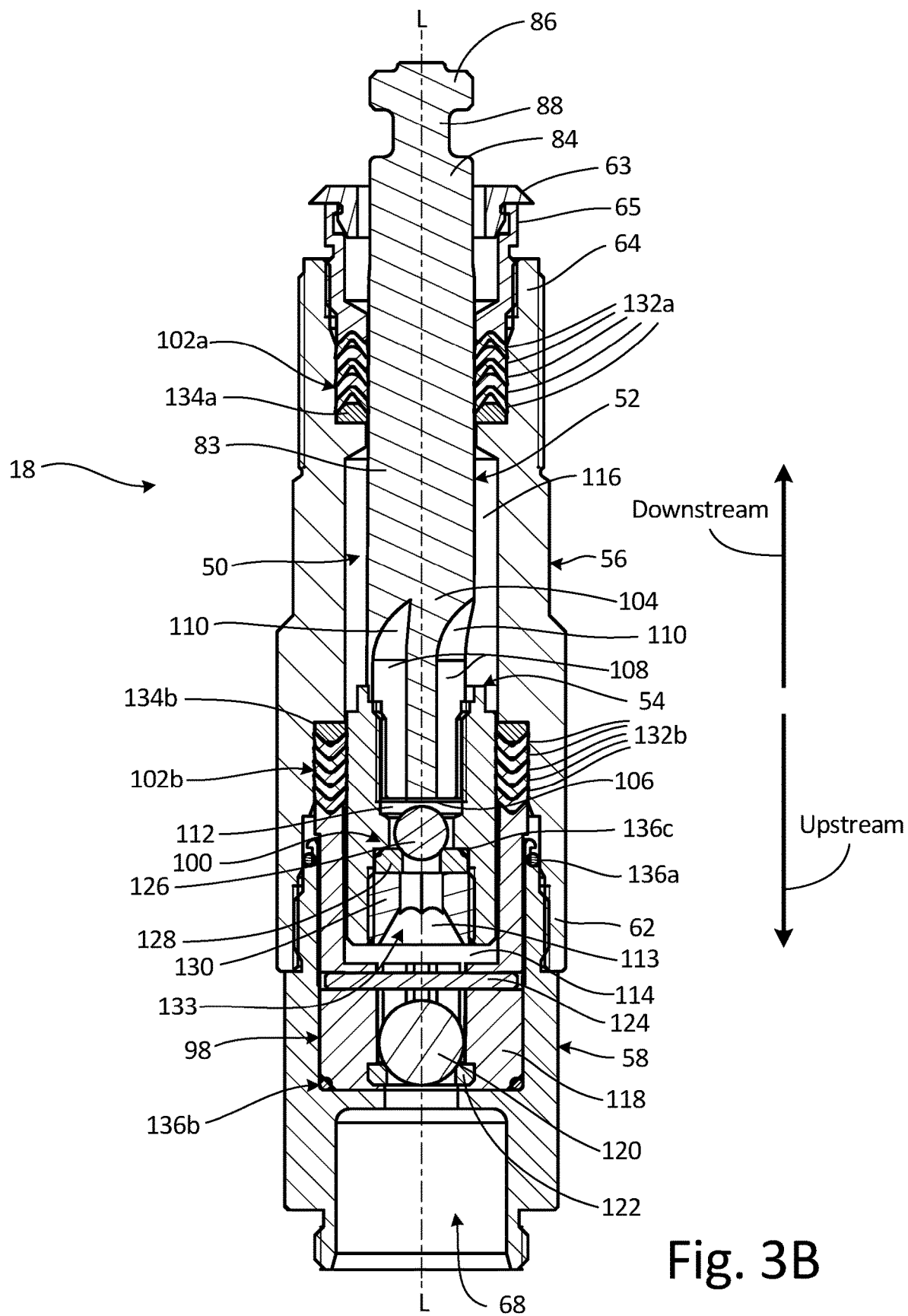
FIG. 3B is a cross-sectional view of the fluid pump of FIG. 3A taken along line A-A of FIG. 3A.

FIG. 3A is an isometric view of displacement pump 18. FIG. 3B is a cross-sectional view of displacement pump 18 taken along line B-B in FIG. 3A. FIGS. 3A and 3B will be discussed together. Displacement pump 18 includes piston 50, cylinder 56, intake housing 58, first check valve 98, second check valve 100, and pressurizing seals 102a and 102b. Piston 50 includes piston rod 52 and piston head 54. Piston rod 52 includes piston rod body 83, first end 84, and second end 104. First end 84 includes head 86 and neck 88. Second end 104 includes upstream face 106 and flutes 108 that include angled surface 110. Piston head 54 includes central bore 133 which extends through the piston head 54. Piston head 54 further includes aperture 112 which, in the embodiment shown, is a downstream portion of the central bore 133, and upstream bore 113, which, in the embodiment shown, is an upstream portion of central bore 133. Cylinder 56 includes upstream end 62, downstream end 64, outlet port 66 (shown in FIG. 3A), first fluid chamber 114, and second fluid chamber 116. Upstream end 62 includes cap 63 and packing nut 65. Intake housing 58 includes inlet port 68. First check valve 98 includes ball cage 118, first ball 120, first seat 122, and pin 124. Second check valve 100 includes second ball 126, second seat 128, and retainer 130. Pressurizing seal 102a includes packing rings 132a and seal gland 134a, and pressurizing seal 102b includes packing rings 132b and seal gland 134b. A generally downstream direction is indicated by downstream arrow, and a generally upstream direction is indicated by upstream arrow.

Intake housing 58 is mounted to upstream end 62 of cylinder 56. Seal 136a, which is disposed between intake housing 58 and cylinder 56, helps to prevent fluid from leaking from between intake housing 58 and cylinder 56.

Piston 50 is at least partially disposed within cylinder 56. Piston 50 extends along longitudinal axis L-L, with longitudinal axis L-L oriented coaxial with the generally elongate profile of displacement pump 18. It is understood that longitudinal axis L-L can be oriented coaxially with cylinder 56, intake housing 58, and various other components of displacement pump 18.

Piston rod 52 extends into cylinder 56 through downstream end 64 of cylinder 56. Piston rod 52 extends through cap 63 and packing ring 65. Piston rod body 83 is elongated between first end 84 and second end 104. First end 84 of piston rod 52 projects of out cylinder 56. Head 86 and neck 88 are configured to connect to a driving mechanism, such as reciprocating drive 20 (shown in FIG. 1B), such that head 86 and neck 88 are retained axially and laterally, but are not prevented from rotating about longitudinal axis L-L. As such, while head 86 is illustrated as being generally circular, it is understood that head 86 may have any desired shape suitable for being retained without restricting the rotation of piston 50. For example, head 86 can be generally square, triangular, domed, or any other desired shape. While first end 84 is described as including head 86 and neck 88, it is understood that first end 84 may include any suitable feature for connecting with a driving mechanism such that piston 50 is driven in a reciprocating manner but is free to rotate about longitudinal axis L-L.

Second end 104 of piston rod 52 is at least partially disposed within aperture 112 of piston head 54. Second end 104 is secured within aperture 112, thereby attaching piston rod 52 to piston head 54. Second end 104 can be secured within aperture 112 in any suitable manner. For example, piston rod 52 and piston head 54 can be separately formed and later attached, such as by exterior threading disposed on second end 104 mating with interior threading disposed within aperture 112, by gluing, by welding, or by any other suitable method. Piston rod 52 and piston head 54 can also be integrally formed, such that piston 50 is of a single-piece construction.

Piston head 54 is disposed within cylinder 56 and divides cylinder 56 into first fluid chamber 114 and second fluid chamber 116. Flutes 108 are disposed between an exterior of piston rod 52 and an interior of piston head 54, and flutes extend along piston rod 52 and into second fluid chamber 116. Flutes 108 terminate in angled surfaces 110, and each angled surface 110 is oriented to expel the fluid in the same circumferential direction about piston rod 52. Angled surfaces 110 can be any portion of a flute 108 configured to direct the fluid in a direction offset from longitudinal axis L-L. For example, a full length of flute 108 may be offset from longitudinal axis L-L, and in such an instance the full length of flute 108 would comprise angled surface 110.

First check valve 98 is mounted in intake housing 58. Ball cage 118 is disposed within intake housing 58, and first ball 120 is disposed within ball cage 118. First seat 122 is disposed between ball cage 118 and inlet port 68 of intake housing 58. Pin 124 extends through ball cage 118 and is disposed on a downstream side of first ball 120. Seal 136*b* is disposed between intake housing 58 and ball cage 118 to prevent leakage of fluid between intake housing 58 and ball cage 118.

Second check valve 100 is disposed within central bore 133 of piston head 54, and more specifically within upstream bore 113. Second seat 128 is disposed within upstream bore 113, and retainer 130 engages an interior surface of upstream bore 113, such as with threading, to secure second seat 128 within upstream bore 113. Second ball 126 is disposed within central bore 133 between second seat 128 and upstream face 106 of piston rod 52. Second seat 128 and retainer 130 are fixed relative to piston head 54. Second ball 126 is movable between a closed position, where second ball 126 abuts second seat 128, and an open position, where second ball 126 abuts upstream face 106. Seal 136*c* is disposed between second seat 128 and piston head 54 to prevent leakage of fluid through piston head 54.

Pressurizing seal 102*a* is disposed between cylinder 56 and first end 84 of piston rod 52. Cap 63 and packing nut 65 are attached to downstream end 64 of cylinder 56 and retain pressurizing seal 102*a* within cylinder 56. Pressurizing seal 102*a* remains stationary with respect to cylinder 56 as piston rod 52 moves relative to cylinder 56 during operation. Packing rings 132*a* surround and tightly interface with first end 84 of piston rod 52 to create a seal about first end 84. The seal about first end 84 prevents the fluid from leaking out of downstream end 64 of cylinder 56 about piston rod 52. Pressurizing seal 102*b* is disposed between piston head 54 and cylinder 56. Similar to pressurizing seal 102*a*, pressurizing seal 102*b* remains stationary with respect to cylinder 56 as piston head 54 moves relative to cylinder 56 during operation. Packing rings 132*b* surround and tightly interface with piston head 54 to create a seal. The seals created between pressurizing seal 102*a* and first end 84, and pressurizing seal 102*b* and piston head 54 facilitate a vacuum condition in cylinder 56 that draws the fluid into and dispels the fluid from cylinder 56. While pressurizing seal 102*a* and pressurizing seal 102*b* are described as remaining stationary relative to cylinder 56 as piston 50 reciprocates within cylinder 56, it is understood that pressurizing seal 102*a* and/or pressurizing seal 102*b* can be mounted to piston 50 such that the pressurizing seal 102*a* and/or pressurizing seal 102*b* moves with piston 50 relative to cylinder 56. It is noted in summary that the piston (including the piston head and piston rod) and/or the packing rings 132 linearly translates in a reciprocating manner relative to the cylinder 56 and/or the packing rings 132 to pump fluid.

Seal gland 134*a* retains packing rings 132*a*, and seal gland 134*b* retains packing rings 132*b*. While a single seal gland 134 is illustrated for each stack of packings rings 132*a* and 132*b*, it is understood that a pair of seal glands 134, such as a first seal gland disposed on the upstream side and a second seal gland disposed the downstream side of a stack of packing rings, can be utilized to retain packing rings 132*a* and 132*b*. While displacement pump 18 is illustrated as including two pressurizing seals 102, it is understood that displacement pump 18 can include a greater or lesser number of pressurizing seals 102.

Piston 50 is driven through an upstroke and a downstroke along longitudinal axis L-L by a driving mechanism, such as reciprocating drive 20, to draw fluid into and drive fluid downstream from displacement pump 18. During an upstroke, piston 50 is drawn in the downstream direction along longitudinal axis L-L. As piston 50 moves in the downstream direction, first fluid chamber 114 expands and second fluid chamber 116 contracts, due to piston head 54 shifting in the downstream direction. The expanding first fluid chamber 114 experiences a vacuum condition that causes first ball 120 to shift from abutting first seat 122 to abut pin 124. With first ball 120 abutting pin 124, a flowpath is opened through first check valve 98, and fluid is drawn into first fluid chamber 114 through inlet port 68 and first check valve 98. During the upstroke, second ball 126 is forced onto second seat 128 and forms a seal with second seat 128 to prevent fluid within second fluid chamber 116 from flowing upstream into first fluid chamber 114. As the volume of second fluid chamber 116 decreases, the fluid within second fluid chamber 116 is driven downstream through outlet port 66 in cylinder 56.

After an upstroke, piston 50 reverses course and is driven through a downstroke. During a downstroke piston 50 is driven in the upstream direction. During the downstroke, the volume of first fluid chamber 114 contracts and the volume of second fluid chamber 116 expands. As piston 50 changes over from the upstroke to the downstroke second ball 126 shifts from engaging second seat 128 to abutting upstream face 106, providing a flowpath through second check valve 100. With second ball 126 abutting upstream face 106, fluid is able to flow downstream from first fluid chamber 114 and into second fluid chamber 116. As second ball 126 shifts to abut upstream face 106, first ball 120 shifts from abutting pin 124 to engaging first seat 122. First ball 120 engaging first seat 122 closes first check valve 98 such that fluid is prevented from backflowing from first fluid chamber 114 through inlet port 68. Outlet port 66 is in unobstructed fluid communication with second fluid chamber 116, and as will be appreciated, fluid is driven downstream through outlet port 66 during both the upstroke and the downstroke of piston 50.

As piston 50 travels through the downstroke, the fluid within first fluid chamber 114 flows through piston head 54, second check valve 100, and flutes 108 to enter second fluid chamber 116. The fluid flows along flutes 108 disposed on second end 104 of piston rod 52 between upstream face 106 and second fluid chamber 116. Flutes 108 thus provide a flowpath for the fluid to flow into second fluid chamber 116. Flutes 108 can be configured to provide the sole flowpath for fluid to flow from the first fluid chamber 114 to the second fluid chamber 116. In the embodiment shown, no alternative pathway besides flutes 108 is provided for the fluid to flow from the first fluid chamber 114 to the second fluid chamber 116. In this way, the flutes 108 are internal fluid passages within the piston 50 through which fluid being pumped is forced to flow by the reciprocation of the piston 50. As the fluid flows along flutes 108, angled surfaces 110 direct the flow at an angle offset from longitudinal axis L-L and substantially tangential with respect to the circumference of piston rod 52. The fluid flowing along angled surfaces 110 imparts a moment on piston rod 52, torqueing the piston rod 52. The moment causes piston rod 52, and thus piston 50, to rotate circumferentially about longitudinal axis L-L. The angled surfaces 110 of the flutes 108 are positioned to expel fluid from the piston 50 at one or more orientations that are offset from the longitudinal axis to impart the moment on the piston 50 about the longitudinal axis to cause the piston 50 to rotate during reciprocation of the piston 50. Expelling the fluid along the one or more orientations incrementally rotates piston 50 about longitudinal axis L-L with each reciprocation cycle such that piston 50 makes a complete 360 degree rotation over multiple reciprocation cycles.

As shown, angled surfaces 110 are configured to expel fluid in generally the same circumferential direction. As such, the moments imparted on piston rod 52 at each angled surface 110 are cumulative. In embodiments where pressurizing seals 102a or 102b remain stationary relative to cylinder 56, piston 50 rotates relative to pressurizing seals 102a and 102b. In embodiments where pressurizing seals 102a and 102b are mounted on and move with piston 50, pressurizing seals 102 rotate with piston 50 relative to cylinder 56.

Piston 50, cylinder 56, intake housing 58, retainer 130, ball cage 118, and pin 124 can be machined or cast from any type of steel, brass, aluminum, or other suitable metal. In particular, piston rod 52 and piston head 54 can be formed from hardened 440C stainless steel. Piston rod 52 can be chromed along those surfaces that interface with packing rings 132a. Piston rod 52 and piston head 54 can be fabricated separately. Flutes 108 and angled surfaces 110 can be formed with any suitable manufacturing technique, such as flat or ball-end milling from a side of piston rod 52, or drilling from an end of piston rod 52. Flutes 108 and angled surfaces 110 can also be cast-in-place. After angled surfaces 110 are formed, and piston rod 52 and piston head 54 can be joined to form piston 50. Ball cage 118 can also be molded from a polymer. Packing rings 132a and 132b can be formed from leather, polymer, or other suitable sealing materials. First seat 122 and second seat 128 can be formed from a high-strength material, such as tungsten carbide. First ball 120 and second ball 126 can be formed from stainless steel or other suitable materials for forming a seal with first seat 122 and second seat 128, respectively.

Rotating piston 50 relative to cylinder 56 provides significant advantages. Where pressurizing seals 102a and 102b remain stationary relative to cylinder 56, packing rings 132 of pressurizing seals 102a and 102b interface with and seal tightly against piston rod 52 and piston head 54. Where pressurizing seals 102a and 102b reciprocate with piston 50 relative to cylinder 56, packing rings 132 of pressurizing seals 102a and 102b interface with and seal tightly against cylinder 56. The interfacing surfaces experience wear and erosion due to the tight interface fit at the interfacing surfaces. Moreover, grit and other solids in the fluid can become disposed between the interfacing surfaces, thereby causing accelerated wear on the interfacing surfaces. The grit and other solids can cause packing rings 132 to wear asymmetrically. Asymmetrical wear leads to greater penetration of the fluid between the interfacing surfaces, leading to imbalanced reciprocation of piston 50 and potential creation of a bypass channel past pressurizing seals 102a and 102b that allows the fluid to flow through pressurizing seals 102a and 102b. Continuously rotating piston 50 while piston 50 reciprocates within cylinder 56 induces symmetrical wear of packing rings 132. If grit or other solids become disposed between the interfacing surfaces, rotating piston 50 distributes the wear caused by the grit and other solids about the circumference of the interfacing surfaces. Rotating piston thereby minimizes the likelihood of a bypass channel forming, preventing packing rings 132 from failing prematurely. Symmetrical wear also prevents imbalance of the piston 50, as symmetrical wear on packing rings 132a and 132b ensures that the forces imparted on packing rings 132a and 132b are evenly distributed.

Figure 4A:
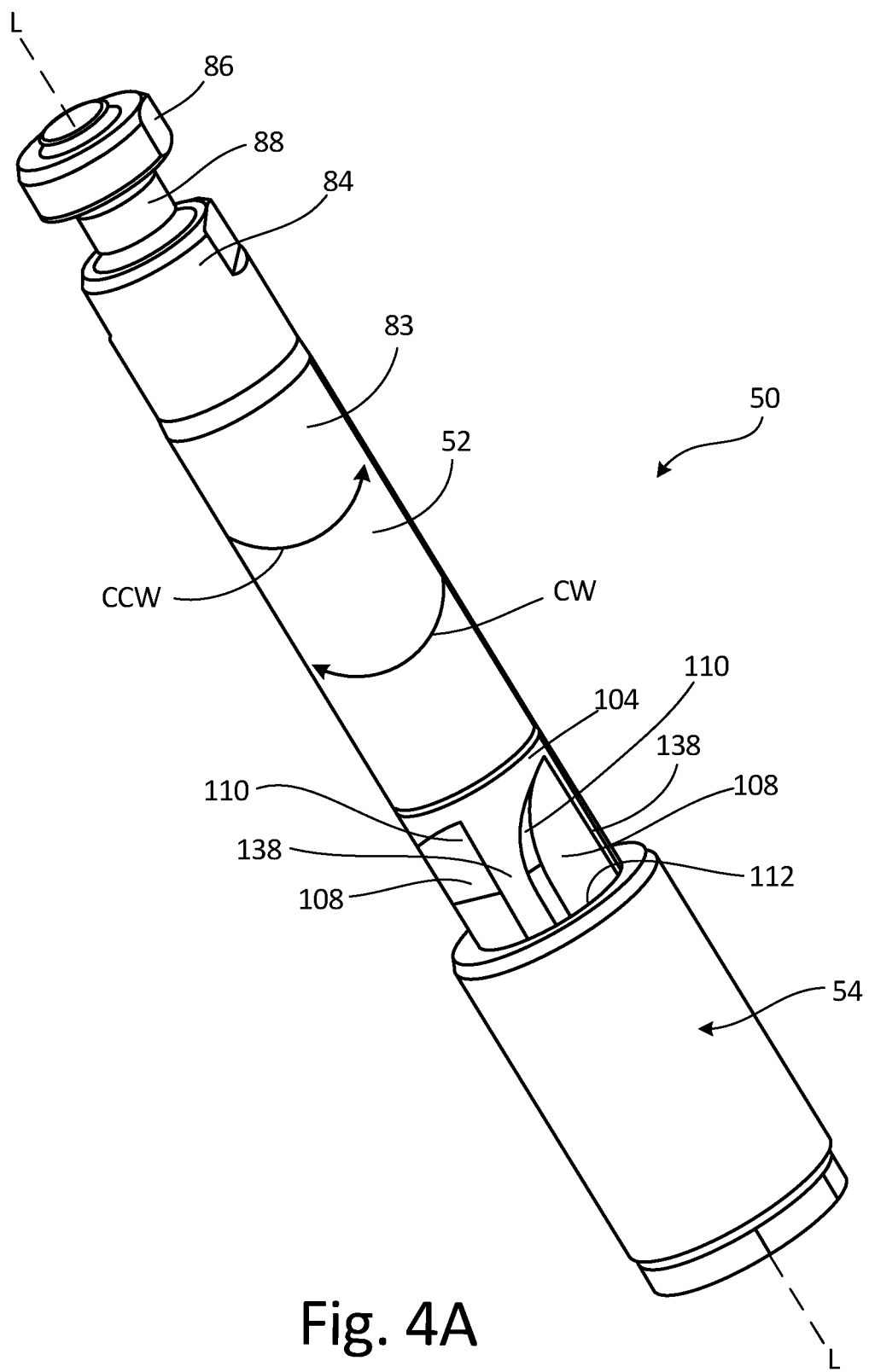
FIG. 4A is an assembled isometric view of a piston rod and piston head.
Figure 4B:
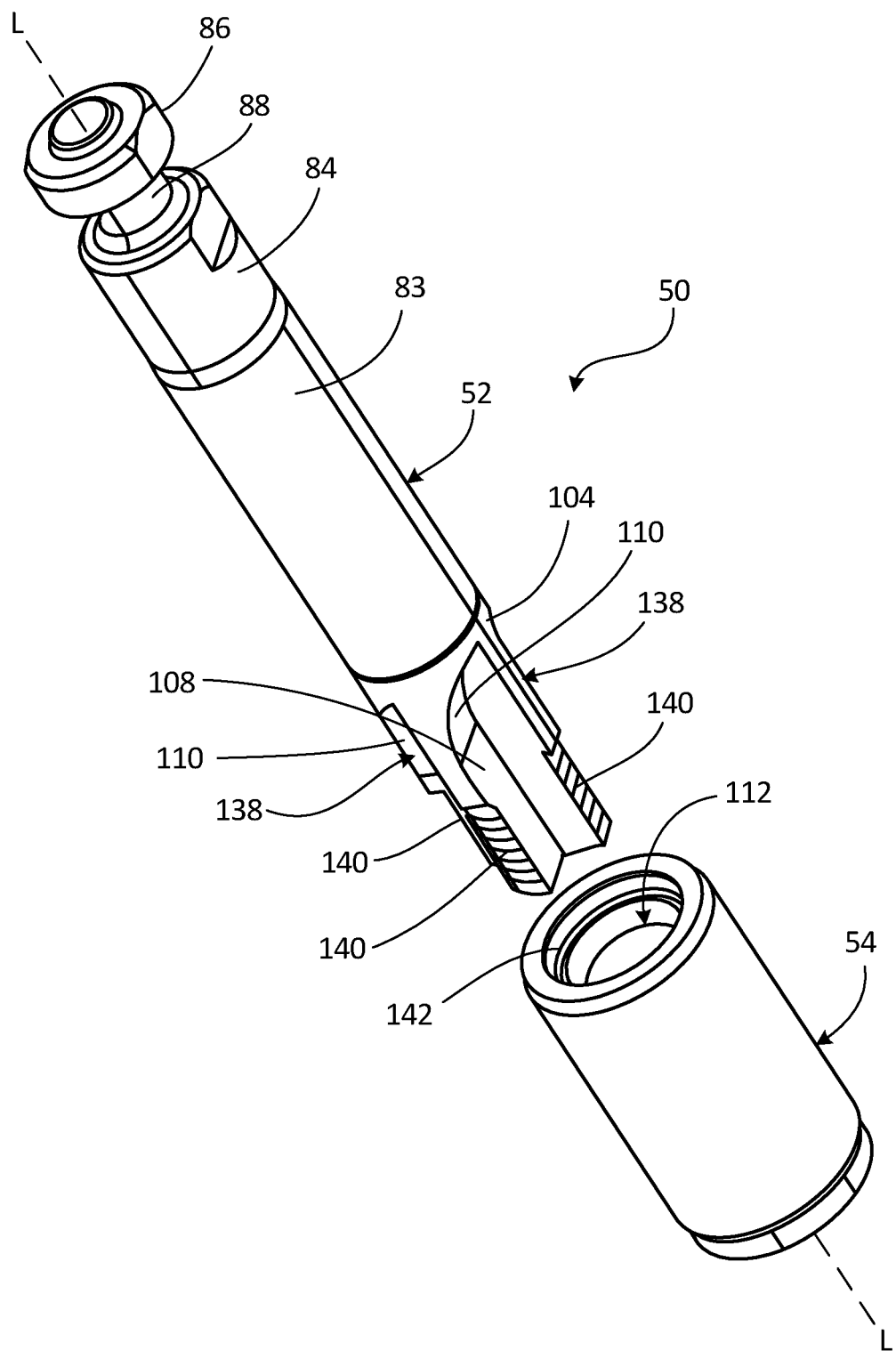
FIG. 4B is an exploded isometric view of the piston rod and piston head of FIG. 4A.

FIG. 4A is an assembled isometric view of piston 50. FIG. 4B is an exploded isometric view of piston 50. FIGS. 4A and 4B will be discussed together. Piston 50 includes piston rod 52 and piston head 54. Piston rod 52 includes piston rod body 83, and piston rod body 83 includes first end 84 and second end 104. First end 84 includes head 86 and neck 88. Second end 104 includes upstream face 106, flutes 108, and ridges 138. Flutes 108 include angled surfaces 110, and ridges 138 include rod connecting portion 140. Aperture 112 of piston head 54 is shown, and aperture 112 includes piston connecting portion 142.

Head 86 and neck 88 are disposed at a distal end of first end 84 of piston rod 52. The distal end of first end 84 is configured to extend out of a pump housing, such as cylinder 56 (best seen in FIGS. 3A and 3B), and head 86 and neck 88 are configured to engage a driving mechanism, such as reciprocating drive 20 (shown in FIGS. 1B and 2). Second end 104 of piston rod 52 extends at least partially into aperture 112 of piston head 54, with upstream face 106 disposed within aperture 112. Flutes 108 and ridges 138 extend along second end 104 and terminate outside of aperture 112. While flutes 108 are described as terminating outside of aperture 112, it is understood that flutes 108 can extend any desired distance outside of aperture 94 such that the fluid is introduced downstream through flutes 108. As such, flutes 108 can be partially overlapped by piston head 54 and partially exposed. Ridges 138 can represent a constant diameter from body of piston rod 52, such that flutes 108 are formed by removal of material from second end 104 of piston rod 52. As illustrated, angled surfaces 110 are disposed at a downstream end of flutes 108, but it is understood that angled surfaces 110 may extend along any length, including an entire length, of flutes 108. For example, flute 108 may be angled with respect to longitudinal axis L-L, such that an entire length of flute 108 comprises an angled surface 110.

Ridges 138 are disposed between and divide flutes 108, such that flutes 108 can be depressions between ridges 138. Rod connecting portion 140 extends along an upstream portion of ridges 138, but rod connecting portion 140 can extend along any desired length of ridges 138. Piston connecting portion 142 is disposed on an interior surface of aperture 112 and can extend fully about the interior surface of aperture 112. Rod connecting portion 140 can include any suitable feature for interfacing with piston connecting portion 142, to thereby secure piston rod 52 to piston head 54. As shown, rod connecting portion 140 can include exterior threading and piston connecting portion 142 can include interior threading configured to mate with the exterior threading. Where rod connecting portion 140 includes exterior threading, the exterior threading can be limited to ridges 138 such that the exterior threading is interrupted by flutes 108. In addition to being connected with threads, rod connecting portion 140 can also be glued or welded to piston connecting portion 142. Moreover, rod connecting portion 140 can be formed integral with piston connecting portion 142, such that piston 50 is of a single-piece construction.

During operation, piston 50 is driven in a reciprocating manner along longitudinal axis L-L. As discussed above, a fluid enters piston head 54 at an upstream end of aperture 112 and flows through aperture 112 to downstream end of piston head 54. As the fluid flows downstream through aperture 112, the fluid encounters upstream face 106 of piston rod 52 and flows through flutes 108. As the fluid flows through flutes 108, the fluid encounters angled surfaces 110 and exerts a force on angled surfaces 110. Each angled surface 110 is oriented to direct the fluid in the same circumferential direction as the other angled surfaces 110. As such, the moment imparted on piston rod 52 at each angled surface 110 is cumulative, and the cumulative forces cause piston 50 to rotate about longitudinal axis L-L. Driving piston 50 in a reciprocating manner thus induces rotation of piston 50.

A rotating piston 50 provides significant advantages. Rotating piston 50 induces symmetrical wear of packing rings 132 (shown in FIG. 3B) and other internal components in the displacement pump. If grit or other solids suspended in the fluid become disposed between the interfacing surfaces, such as between packing rings 132 and piston 50 or between packing rings 132 and cylinder 56 (best seen in FIG. 3B), rotating piston 50 distributes the wear caused by the grit and other solids about the circumference of the interfacing surfaces. Rotating piston 50 thereby minimizes the likelihood of a bypass channel forming through packing rings 132, thereby preventing packing rings 132 from failing prematurely. Symmetrical wear also prevents imbalance of the piston 50, as symmetrical wear on packing rings 132a and 132b ensures that the forces imparted on packing rings 132a and 132b are evenly distributed.

Moreover, a two-piece, rotating piston 50 provides significant advantages. Where rod connecting portion 140 includes external threading and piston connecting portion 142 includes internal threading, angled surfaces 110 are configured to rotate the piston 50 such that piston rod 52 is self-tightening with piston head 54. For example, where the exterior threading on rod connecting portion 140 comprises a right-hand thread, angled surfaces 110 induce clockwise rotation of piston 50, as indicated by arrow CW. Similarly, where exterior threading on rod connecting portion 140 comprises a left-hand thread, angled surfaces 110 are oriented to induce counterclockwise rotation of piston 50, as indicated by arrow CCW. In either embodiment, the moment imparted to the piston rod 52 by the fluid encountering angled surfaces 110 causes piston rod 52 to tighten onto piston head 54, also preventing piston head 54 from unscrewing from piston rod 52 during operation.

Figure 5A:
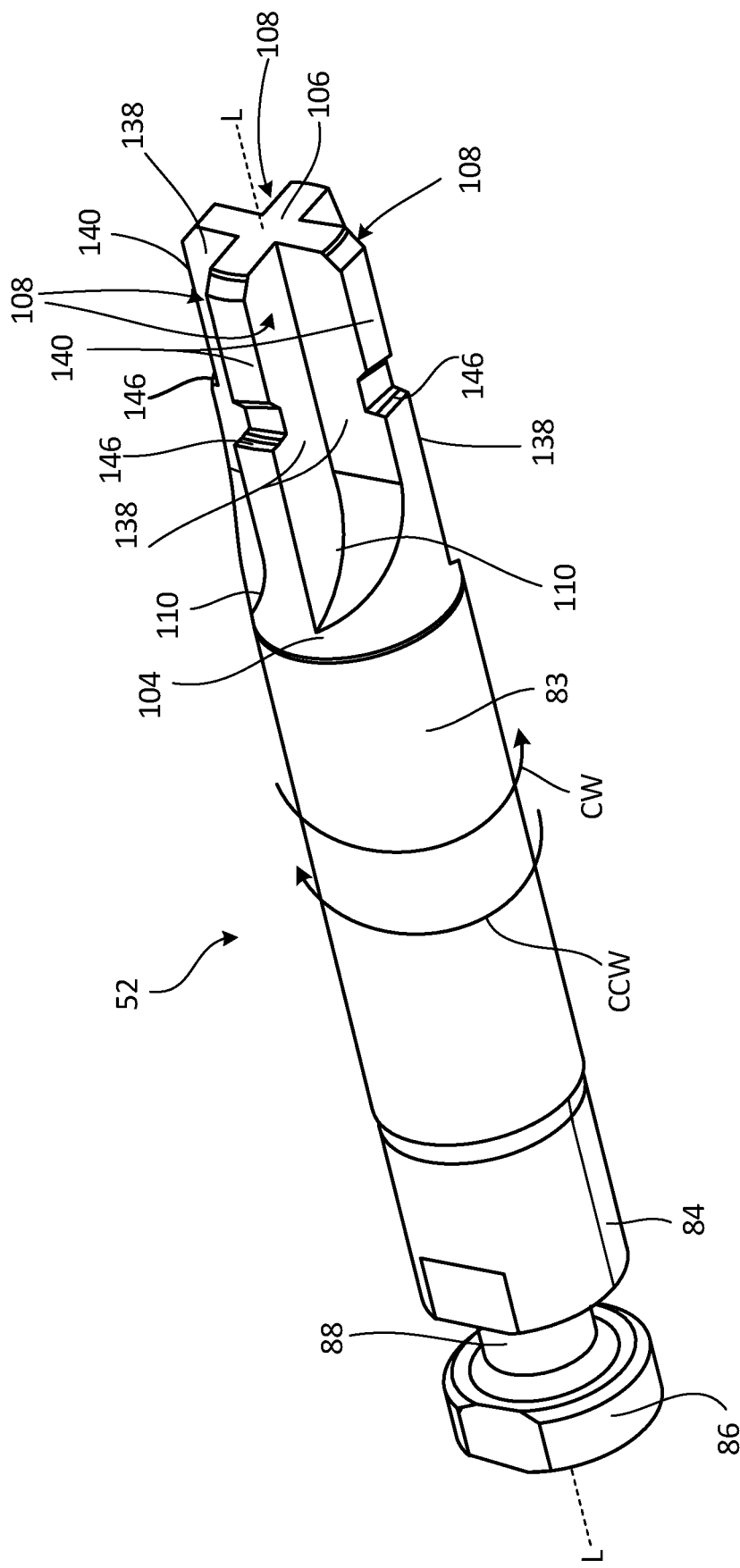
FIG. 5A is an isometric view of a piston rod.
Figure 5B:
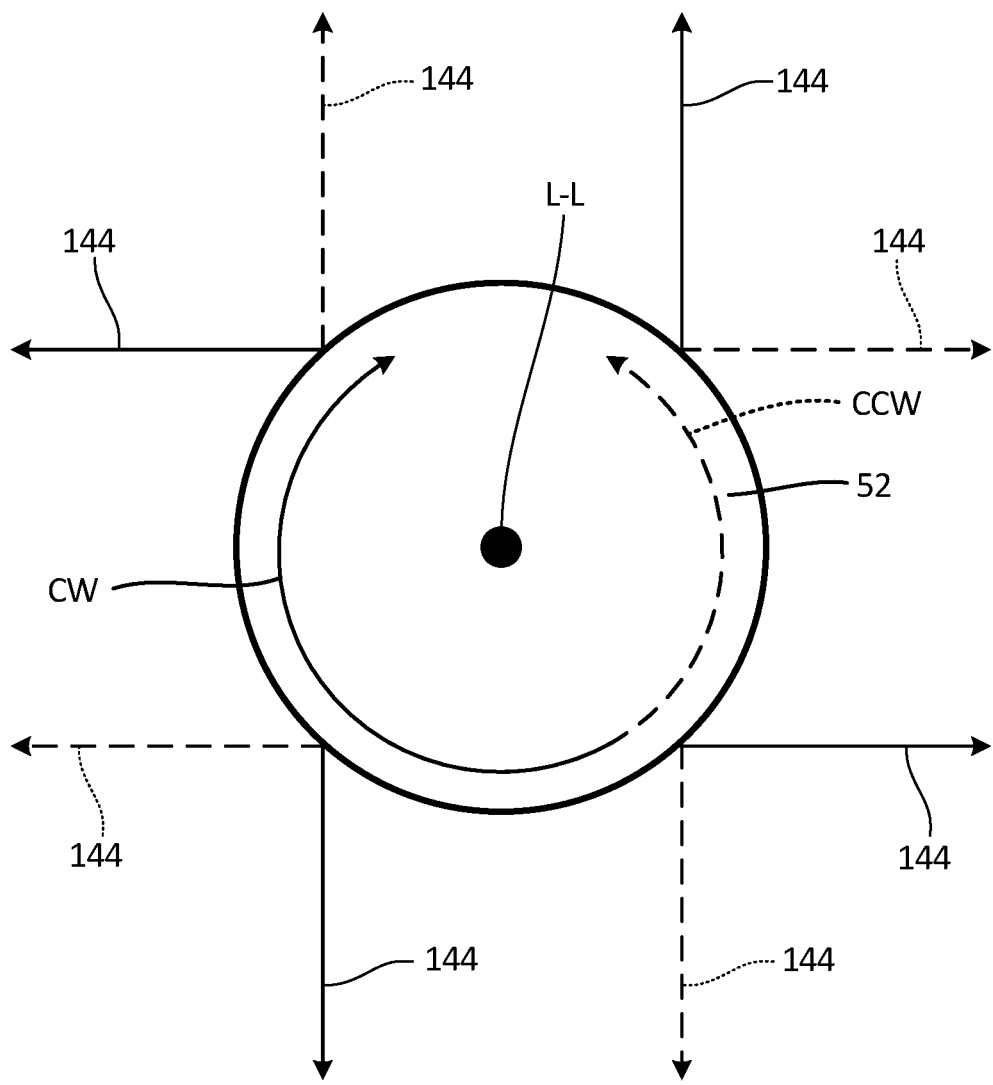
FIG. 5B is a schematic view of a rotation of the piston rod of FIG. 5A.

FIG. 5A is an isometric view of piston rod 52. FIG. 5B is a schematic view of piston rod 52 showing flow vectors 144, representing the orientations of the flow of fluid being expelled from the piston 50 during pumping. Piston rod 52 includes piston rod body 83, and piston rod body 83 includes first end 84 and second end 104. First end 84 includes head 86 and neck 88, and second end 104 includes upstream face 106, flutes 108, and ridges 138. Flutes 108 includes angled surfaces 110, and ridges 138 include rod connecting portion 140 and axial stop 146. Angled surfaces 110 direct a fluid along flow vectors 144.

Head 86 and neck 88 are disposed at a distal end of first end 84 of piston rod 52. Head 86 and neck 88 are configured to connect to a driving mechanism, such as reciprocating drive 20 (shown in FIG. 1B), such that head 86 and neck 88 are retained axially and laterally, but are not prevented from rotating about longitudinal axis L-L.

Second end 104 of piston rod 52 is disposed opposite first end 84. Flutes 108 and ridges 138 extend along second end 104 of piston 54 from upstream face 106. In the illustrated embodiment, angled surfaces 110 are disposed at a terminal, downstream end of flutes 108. It is understood, however, that angled surfaces 110 can comprise any portion, including a full length of, flutes 108. Ridges 138 can be a consistent diameter of the unfluted portion of piston 50, and flutes 108 can be depressions formed between ridges 138. In the embodiment shown, four flutes 108 are evenly arrayed about a circumference of piston rod 52, and the four flutes 108 are separated by four ridges 138. It is understood, however, that piston rod 52 can include any desired number of flutes 108. For example, piston rod 52 can include more or less than four flutes 108, and can include a single flute 108 in an asymmetric configuration. Flutes 108 are formed as depressions between ridges 138, and it is understood that flutes 108 can be formed in any desired manner. For example, flutes 108 can be milled from a side of piston rod 52 or can be drilled from an upstream end of piston rod 52. Moreover, while each flute 108 is described as including angled surface 110, it is understood that less than all flutes 108 can include angled surface 110. For example, where piston rod 52 includes more than one flute 108, a single flute 108 can include angled surface 110 to induce rotation of piston rod 52.

Rod connecting portion 140 extends along an upstream portion of ridges 138 and terminates in axial stop 146. Rod connecting portion 140 is configured to mate with piston connecting portion 142 (shown in FIG. 4B). Axial stop 146 is configured to abut a downstream edge of piston head 54 (shown in FIGS. 3A-4B) to limit a distance that second end 104 extends into aperture 112 (best seen in FIG. 3B) of piston head 54. In this way, axial stop 146 ensures that upstream face 106 is spaced from second ball 126 (shown in FIG. 3B) such that second ball 126 is able to shift to an open position, where second ball 126 abuts upstream face 106.

As piston rod 52 is driven during operation, fluid encounters upstream face 106 and proceeds downstream through flutes 108. The fluid encounters angled surfaces 110, and angled surfaces 110 redirect the flow of the fluid through flutes 108. As the fluid is redirected, the fluid imparts a force on angled surfaces 110. The force experienced at angled surfaces 110 is transmitted to piston rod 52 and induces a rotation in piston rod 52 about longitudinal axis L-L. Angled surfaces 110 can direct the fluid at any angle offset from longitudinal axis L-L and can direct the fluid in a direction substantially tangential to the circumference of piston rod 52. Angled surfaces 110 are each oriented to expel the fluid in generally the same circumferential direction (either clockwise or counterclockwise), such that the moments imparted on piston rod 52 are cumulative and do not cancel each other out. As such, each moment increases the overall moment experienced by piston rod 52, further inducing rotation of piston rod 52.

As shown in FIG. 5B, the orientation of angled surfaces 110 is configured to direct the fluid along a vector 144 not aligned with longitudinal axis L-L. Expelling the fluid along vectors 144 imparts a moment on piston rod 52. Each vector 144 is substantially tangential to longitudinal axis L-L and each vector 144 is oriented in substantially the same circumferential direction. With each vector 144 oriented in substantially the same circumferential direction, the moments imparted on piston rod 52 when the fluid is expelled are cumulative. The rotational moments induce rotation of piston rod 52 about longitudinal axis L-L. While vectors 144 are shown as extending generally counterclockwise, thereby imparting a clockwise rotation on piston rod 52, indicated by arrow CW, it is understood that vectors 144 may extend generally clockwise, shown in dashed lines, to impart a counterclockwise rotation on piston rod 52, indicated by dashed arrow CCW, if the shape of the flutes were changed.

Figure 6A:
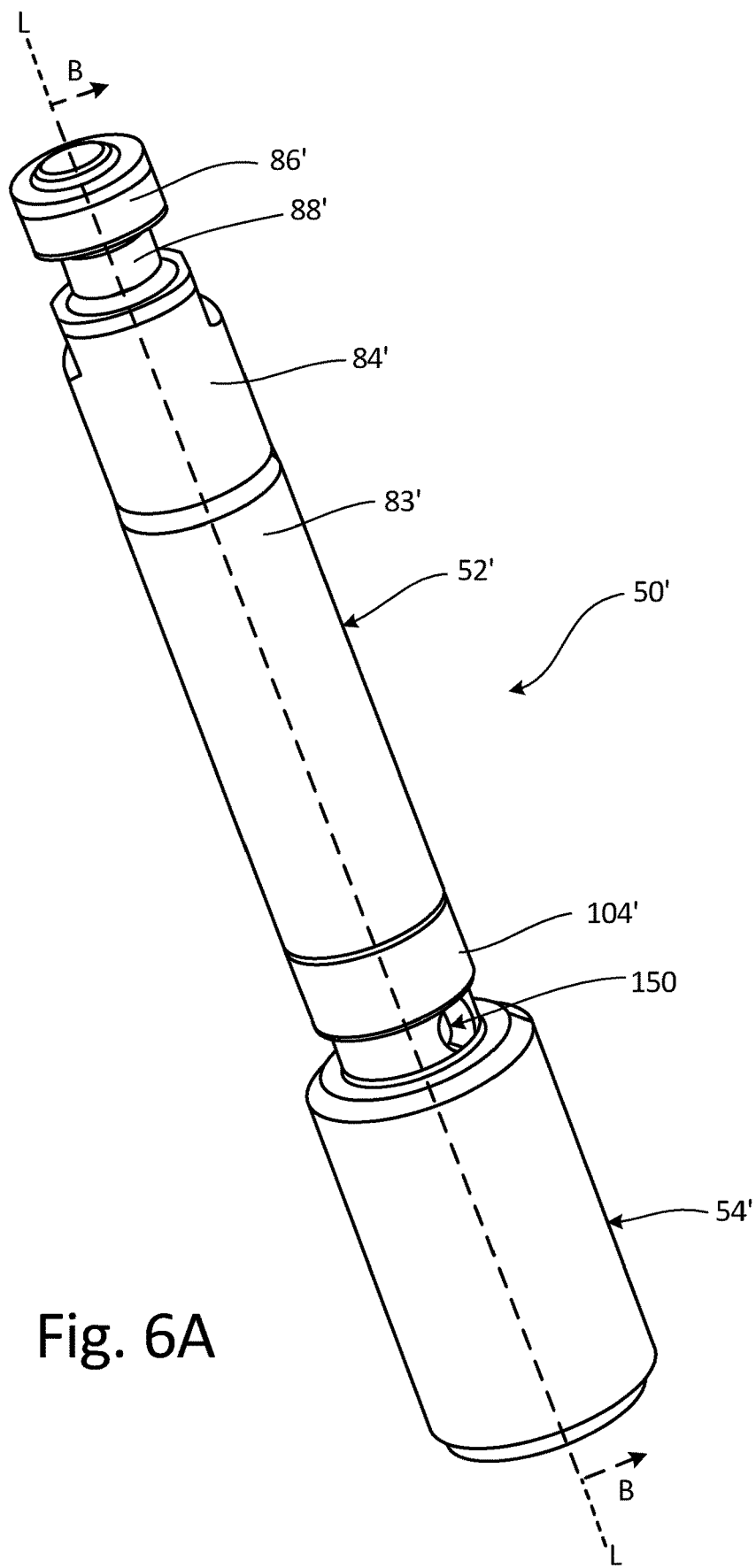
FIG. 6A is an isometric view of a piston.

FIG. 6A is an isometric view of piston 50'. FIG. 6B is a cross-sectional view of piston 50', taken along line B-B of FIG. 6A. FIG. 6C is a schematic view of piston 50', showing flow vectors 144. FIGS. 6A-6C will be discussed together. Piston 50' includes piston rod 52' and piston head 54'. Piston rod 52' includes piston rod body 83', first end 84' and second end 104', and first end 84' includes head 86' and neck 88'. Second end 104' includes central bore 148 and side bore 150. Side bore 150 includes angled surface 110'.

In the embodiment shown, piston rod 52' and piston head 54' are integrally formed, such that piston 50' is of a single-piece construction. It is understood, however, that piston rod 52' and piston head 54' may be separately formed and connected during assembly, similar to piston rod 52 and piston head 54, such as where piston rod 52' includes threading configured to mate with threading on piston head 54', or where piston rod 52' is glued or welded to piston head 54'.

Central bore 148 extends through piston 50' coaxially with longitudinal axis L-L. Central bore 148 extends through piston head 54' and into second end 104' of piston rod 52'. While central bore 148 is described as extending coaxially with longitudinal axis L-L, it is understood that central bore 148 is not necessarily aligned with longitudinal axis L-L, and piston 50' can also include multiple central bores 148 arrayed through piston 50'. Piston 50' is configured for use in any suitable displacement pump, such as displacement pump 18 (shown in FIGS. 1A-3B). In fact, piston 50' can be utilized as a substitute part for piston 50.

Side bore 150 extends into second end 104' of piston rod 52' and is in fluid communication with central bore 148. Angled surface 110' is disposed in side bore 150 and is configured to direct a fluid out of piston 50' at an orientation represented by flow vector 144. Fluid flowing along flow vector 144 is angled relative to longitudinal axis L-L and is directed generally tangential to a circumference of piston rod 52'. The fluid flowing against angled surface 110', thereby being redirected and expelled, imparts a rotational moment on piston rod 52'. Piston can include a single side bore 150 or multiple side bores 150 extending through piston 50' and in fluid communication with central bore 148. Where piston 50' includes multiple side bores 150, at least one side bore 150 can include angled surface 110' and induce rotation of piston 50'. Where multiple side bores 150 include angled surfaces 110', each angled surface 110' is oriented to expel the fluid in generally the same circumferential direction. As such, the moment imparted on piston rod 52' at each angled surface 110' is cumulative.

In FIG. 6C, flow vectors 144 along which the fluid is expelled from side bores 150 are shown. Angled surface 110' direct the pumped surface along flow vector 144 not aligned with longitudinal axis L-L. Directing the fluid along flow vectors 144 imparts a moment on piston rod 52', due to the fluid exerting a force on angled surface 110'. Each flow vector 144 is disposed at an angle to longitudinal axis L-L and is substantially tangential to a circumference of piston rod 52'. In addition, each flow vector 144 is oriented in substantially the same circumferential direction, such that the moments imparted on piston rod 52' when the fluid is expelled along flow vectors 144 are cumulative. The rotational moments cause piston rod 52' to rotate about longitudinal axis L-L. As shown, flow vectors 144 extending generally counterclockwise, thereby imparting a clockwise rotation on piston rod 52', indicated by arrow CW. It is understood, however, that vectors 144 can extend generally clockwise, indicated by dashed lines, to impart a counter-clockwise rotation on piston rod 52', indicated by dashed arrow CCW. Moreover, where piston 50' is of a two-piece construction, like piston 50 (best seen in FIGS. 3B-4B), and piston rod 52' and piston head 54' are connected by threading, flow vectors 144 can be configured to induce piston rod 52 to rotate in the same direction as the threading, such that the rotation of piston rod 52' causes piston rod 52' to tighten into piston head 54'.

Figure 7A:
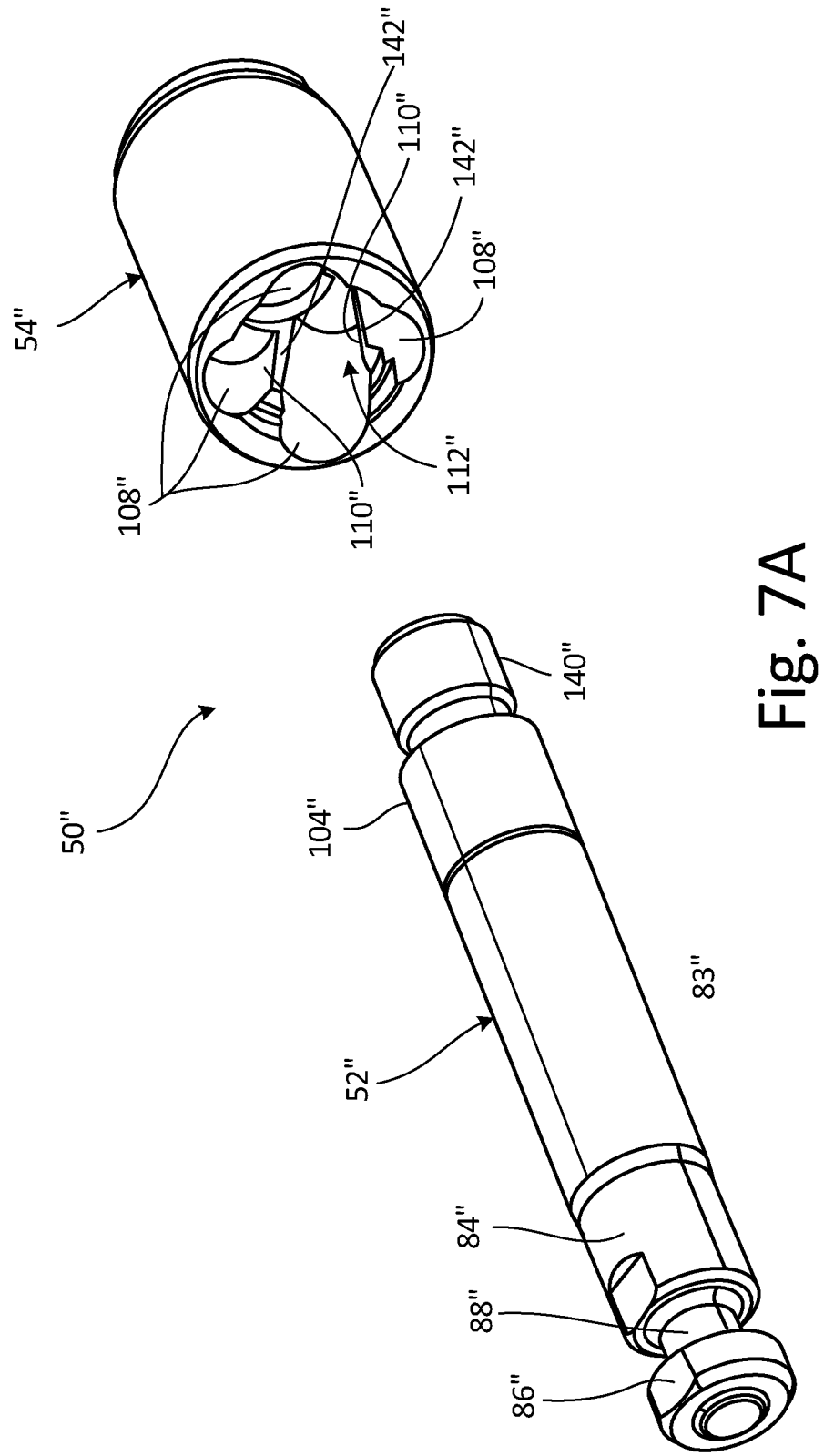
FIG. 7A is an exploded view of a piston.

FIG. 7A is an exploded view of piston 50". FIG. 7B is an isometric view of piston head 54". FIG. 7C is a cross-sectional view of piston head 54" taken along line C-C in FIG. 7B. FIGS. 7A-7C will be discussed together. Piston 50" includes piston rod 52" and piston head 54". Piston head 54" includes central bore 133". Piston head 54" further includes aperture 112" and upstream bore 113", which, in the embodiment shown, form a downstream portion and an upstream portion of central bore 133", respectively. Aperture 112" includes flutes 108" and piston connecting portion 142", and flutes 108" include angled surfaces 110". Piston rod 52" includes piston rod body 83", and piston rod body 83" includes first end 84" and second end 104". First end 84" includes head 86" and neck 88". Second end 104" includes rod connecting portion 140".

Central bore 133" extends through piston head 54" from an upstream end to a downstream end. Aperture 112" is open on a downstream end of piston head 54" and upstream bore 113" is open on an upstream end of piston head 54". Aperture 112" is in fluid communication with upstream bore 113". Flutes 108" extend within aperture 112", and piston connecting portion 142" are disposed between flutes 108". Flutes 108" spiral about an interior of aperture 112", and piston connecting portion 142" similarly spiral about an interior of aperture 112".

Piston rod 52" is configured to attach to piston head 54" to form a piston. Piston rod body 83" is elongate between first end 84" and second end 104". First end 84" is similar to first end 84' and first end 84, in that first end 84" is configured to connect with a driving mechanism, such as reciprocating drive 20 (shown in FIGS. 1B and 2), that connects with and drives first end 84" such that piston 50" is capable of rotating about longitudinal axis L-L. As such, head 86" can be axially and laterally retained by the driving mechanism, while the driving mechanism does not interfere with rotational movement of head 86" or piston rod 52" about longitudinal axis L-L. Second end 104" of piston rod 52" is at least partially disposed within aperture 112", with rod connecting portion 140" interfacing with piston connecting portion 142" to secure piston rod 52" to piston head 54". Rod connecting portion 140" and piston connecting portion 142" can be joined in any desired manner. For example, rod connecting portion 140" can include a first set of threads and piston connecting portion 142" can include a second set of threads configured to mate with the first set of threads. Alternatively, rod connecting portion 140" can be glued or welded to piston connecting portion 142". Piston rod 52" and piston head 54" can also be integrally formed as a single part, in a single-piece configuration. Where piston rod 52" and piston head 54" are separable, such as where piston rod 52" is threaded to piston head 54", only one of piston rod 52" and piston head 54" need be replaced due to the failure of that part. For example, if piston rod 52" were to fail, the failed piston rod 52" could be disconnected from piston head 54" and replaced with a functional piston rod 52". Replacing only one of piston head 54" and piston rod 52" reduces cost and material waste.

Flutes 108" are depressions disposed circumferentially about aperture 112", such that fluid flows between an outer circumference of second end 104" and piston head 54". Flutes 108" are similar to flutes 108 (shown in FIGS. 3B-5), in that both flutes 108" and flutes 108 provide flowpaths for a fluid to flow between a piston rod and a piston. Flutes 108" spiral about longitudinal axis L-L such that angled surfaces 110" comprise an entire length of flutes 108". The angled surfaces 110" direct the fluid into a downstream fluid chamber, such as second fluid chamber 116 (shown in FIG. 3B), such that the fluid flows substantially tangential to a circumference of piston rod 52" when the fluid exits flutes 108". During operation, piston head 54" and piston rod 52" reciprocate along longitudinal axis L-L, similar to piston 50, to drive a fluid downstream through piston head 54". It is understood that piston head 54" and piston rod 52" can be used with any suitable pump, such as displacement pump 18 (shown in FIGS. 1A-3B), including a single-action or a double-action pump.

Flowing the fluid along angled surfaces 110" within flutes 108" imparts a moment on piston head 54". The angled surfaces 110" are disposed at an angle relative to longitudinal axis L-L, such that the flow of fluid is directed at an angle relative to longitudinal axis L-L, and such that the fluid exits flutes 108" along a flow vector substantially tangential to a circumference of piston rod 52". All flutes 108" extend in the same circumferential direction about aperture 112" such that the moments imparted on angled surfaces 110" are cumulative. The moment imparted by the fluid causes piston head 54" to rotate about longitudinal axis L-L as the fluid flows through flutes 108". Inducing rotation in piston head 54" causes piston rod 52" to similarly rotate about longitudinal axis L-L due to the connection or piston head 54" and piston rod 52".

During operation, the fluid enters piston head 54" through upstream bore 113" and flows to aperture 112". The fluid encounters an upstream, distal end of second end 104" of piston rod 52", and flows through flutes 108". The fluid is thus provided downstream through flutes 108" disposed on an interior surface of piston head 54". With flutes 108" disposed on the interior surface of piston head 54", piston rod 52" can consist of a single-piece construction, without any bores or other passageways extending through piston rod 52". In this way, the manufacturing of piston rod 52" is simplified and the cost of piston rod 52" is reduced.

Piston rod 52" and piston head 54" can be machined or cast from metal, such as any type of steel, brass, aluminum, or other suitable metal. In particular, piston rod 52" and piston head 54" can be formed from hardened 440C stainless steel. Piston rod 52" can be chromed along those surfaces that interface with packing rings 132*a* (shown in FIG. 3B). Piston rod 52" and piston head 54" can be fabricated separately. Flutes 108" and angled surfaces 110" can be formed with any suitable manufacturing technique, such as flat or ball-end milling from a side of piston rod 52", or drilling from an end of piston rod 52". Flutes 108" and angled surfaces 110" can also be cast-in-place. After flutes 108" and angled surfaces 110" are formed, and piston rod 52" and piston head 54" can be joined to form a piston.

A two-part piston 50" provides significant advantages. Where piston rod 52" and piston head 54" are separable, such as where piston rod 52" is threaded to piston head 54", only one of piston rod 52" and piston head 54" need be replaced due to the failure of that part. For example, if piston rod 52" were to fail, the failed piston rod 52" could be disconnected from piston head 54" and replaced with a functional piston rod 52". Replacing only one of piston head 54" and piston rod 52" reduces costs and material waste. Moreover, angled surfaces 110" can be oriented to induce rotation such that piston head 54" is screwed onto piston rod 52". As such, aligning a rotational direction with a thread direction cause piston head 54" and piston rod 52" to be self-tightening.

Flutes 108" and angled surfaces 110" provide significant advantages. During operation, the fluid imparts a rotational moment on piston head 54". Rotating piston head 54" causes piston rod 52" to similarly rotate, thereby rotating piston 50". Rotating piston 50" causes sealing surfaces within the displacement pump to experience uniform wear. Rotating the piston thereby increases the lifespan and efficiency of the displacement pump. In addition, fluting on piston head 54" provides advantages, as piston head 54" can be utilized to impart rotation when joined to a non-fluted piston rod, thereby decreasing construction costs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump comprising:
    a cylinder;
    a piston disposed within the cylinder and configured to reciprocate along a spray axis, the piston including at least one outlet;
    a first seal disposed between the cylinder and the piston;
    a second seal disposed between the cylinder and the piston;
    wherein the at least one outlet is disposed on a portion of the piston between the first seal and the second seal; and
    wherein the at least one outlet is configured to expel paint into a chamber defined by the first seal, the second seal, and the cylinder at an orientation offset from the spray axis to induce rotation of the piston relative to the cylinder.

2. The pump of claim 1, wherein the cylinder includes:
    an upstream end;
    a downstream end; and
    an outlet port extending through a side wall that extends between the upstream end and the downstream end, wherein the outlet port is extends through the side wall at a location disposed between the first seal and the second seal.

3. The pump of claim 2, wherein:
    the piston includes a piston rod having a first end and a second end;
    the first end extends out of the downstream end of the cylinder and is configured to connect to a drive mechanism to be driven by the drive mechanism.

4. The pump of claim 3, wherein the first end includes a neck and a rod head.

5. The pump of claim 1, wherein:
    the piston includes a first contact region formed on an exterior of the piston and disposed proximate a first end of the piston, the first contact region configured to contact and fluidly seal against the first seal during reciprocation of the piston;
    wherein the at least one outlet is formed in the piston on an upstream side of the first contact region and wherein the at least one outlet is configured to expel the paint into the chamber to induce rotation of the first contact region relative to the first seal.

6. The pump of claim 5, wherein the piston comprises:
a piston head; and
a piston rod connected to the piston head;
wherein the first contact region is formed on the piston rod and the at least one outlet extends through the piston rod.

7. The pump of claim 6, wherein the at least one outlet comprises at least one side bore shaped to redirect the paint from a central bore of the piston rod and expel the paint into the chamber.

8. The pump of claim 7, wherein:
the at least one side bore includes one or more angled surfaces, the one or more angled surfaces configured to redirect the flow of the paint along one or more vectors during reciprocation of the piston rod; and
each of the one or more vectors is orientated away from the piston rod and offset from the longitudinal axis such that the redirecting of the paint along the one or more vectors by the one or more angled surfaces causes rotation of the piston rod during reciprocation of the piston rod.

9. The pump of claim 6, wherein the at least one outlet comprises:
at least one flute formed on an exterior of the piston rod, the at least one flute including one or more angled surfaces configured to redirect the flow of the paint and expel the paint into the chamber at the at least one orientation offset from the axis.

10. The pump of claim 9, wherein the at least one flute includes a first flute and a second flute that are at least partially disposed between and bounded by the piston head and the piston rod.

11. The pump of claim 6, wherein the piston head is joined to the piston rod such that the piston head and the piston rod simultaneously rotate during reciprocation of the piston.

12. The pump of claim 11, wherein each orientation of the at least one orientation is in one of the clockwise or counterclockwise direction about the piston, and the piston rod threadedly screws into the piston head in the same clockwise or counterclockwise direction such that the threaded connection between the piston rod and the piston head is at least one of tightened and maintained in tightness by each reciprocation cycle.

13. The pump of claim 5, wherein the piston includes a second contact region formed on an exterior of the piston and disposed proximate a second end of the piston, the second contact region configured to contact and fluidly seal against the second seal during reciprocation of the piston.

14. The pump of claim 13, wherein the second contact region is formed on an exterior of a piston head of the piston, the piston head joined to a piston rod.

15. The pump of claim 14, wherein the at least one outlet is configured to expel the paint into the chamber to induce rotation of the second contact region relative to the second seal.

16. A paint spraying system comprising:
the pump of claim 1; and
a spray gun fluidly connected to receive paint from the pump and configured to spray the paint onto a surface;
wherein the piston is configured to reciprocate within the cylinder to drive paint from a reservoir to the spray gun.

17. A method of pumping paint under pressure, the method comprising:
driving reciprocation of a pump rod of a double displacement pump along a longitudinal axis within a cylinder of the pump;
flowing paint out of the pump rod and into a chamber defined by the cylinder of the pump through at least one outlet formed in the pump rod, wherein the at least one outlet expels fluid into the chamber along at least one orientation offset from the axis thereby inducing rotation of the pump rod relative to the cylinder;
wherein at least a portion of the pump rod contacts and seals against a first seal disposed within the cylinder, an interface between the pump rod and the first seal at least partially defining the chamber.

18. The method of claim 17, wherein the step of flowing paint out of the pump rod and into the chamber defined by the cylinder of the pump through the at least one outlet formed in the pump rod includes:
flowing the paint through a central bore formed in the pump rod; and
flowing the paint out of the central bore and into the chamber through at least one side bore extending through the pump rod to the central bore, the at least one side bore forming the at least one outlet;
wherein the at least one side bore includes one or more angled surfaces, the one or more angled surfaces configured to redirect the flow of the paint along one or more vectors during reciprocation of the piston to induce the rotation of the piston.

19. The method of claim 17, wherein the step of flowing paint out of the pump rod and into the chamber defined by the cylinder of the pump through the at least one outlet formed in the pump rod includes:
flowing the paint through at least one flute formed on an exterior of the pump rod, the at least one flute defining the outlet and including one or more angled surfaces configured to redirect the flow of the paint and expel the paint into the chamber at the orientation offset from the axis.

20. The method of claim 17, wherein the step of flowing paint out of the pump rod and into the chamber defined by the cylinder of the pump through the at least one outlet formed in the pump rod includes:
flowing the paint out of the pump rod and into the chamber through a first outlet formed in the pump rod and through a second outlet formed in the pump rod;
wherein the first outlet is oriented to expel paint into the chamber and induce rotation of the pump rod in one of the clockwise and counterclockwise direction; and
wherein the second outlet is oriented to expel paint into the chamber and induce rotation of the pump rod in the same one of the clockwise and counterclockwise direction.

* * * * *